(12) United States Patent
Kusunoki et al.

(10) Patent No.: US 11,913,637 B2
(45) Date of Patent: Feb. 27, 2024

(54) PLANAR ILLUMINATION DEVICE

(71) Applicant: MINEBEA MITSUMI Inc., Nagano (JP)

(72) Inventors: Ippei Kusunoki, Kitasaku-gun (JP); Toru Kunimochi, Kitasaku-gun (JP); Takahito Yoshida, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/040,671

(22) PCT Filed: Jun. 25, 2021

(86) PCT No.: PCT/JP2021/024247
§ 371 (c)(1),
(2) Date: Feb. 6, 2023

(87) PCT Pub. No.: WO2022/030137
PCT Pub. Date: Feb. 10, 2022

(65) Prior Publication Data
US 2023/0296225 A1 Sep. 21, 2023

(30) Foreign Application Priority Data

Aug. 7, 2020 (JP) ................. 2020-134427

(51) Int. Cl.
*F21V 7/00* (2006.01)
*F21V 7/10* (2006.01)
*F21Y 105/10* (2016.01)

(52) U.S. Cl.
CPC .............. *F21V 7/0066* (2013.01); *F21V 7/10* (2013.01); *F21Y 2105/10* (2016.08)

(58) Field of Classification Search
CPC ....... F21V 7/0066; F21V 7/10; F21Y 2105/10
See application file for complete search history.

(56) References Cited

U.S. PATENT DOCUMENTS 8,545,075 B2 * 10/2013 Park ................. G02F 1/133603
362/555
2010/0283906 A1 11/2010 Kuromizu
(Continued)

FOREIGN PATENT DOCUMENTS

JP 2011-124196 A 6/2011
JP 2013-246988 A 12/2013
(Continued)

OTHER PUBLICATIONS

English translation for Written Opinion for corresponding International Application No. PCT/JP2021/024247 dated Aug. 3, 2021.
(Continued)

*Primary Examiner* — Evan P Dzierzynski
(74) *Attorney, Agent, or Firm* — Pearne & Gordon LLP

(57) ABSTRACT

In a planar illumination device according to an embodiment, a reflector can be stably fixed to a substrate even when a temperature change occurs. A planar illumination device includes a substrate provided with a plurality of light sources at one surface side, a reflector provided at the one surface side of the substrate, a bottom frame provided at a surface side of the substrate opposite to the one surface side, a first fixing member configured to fix a center portion of the reflector in a longitudinal direction to the bottom frame, and a second fixing member configured to fix the one surface of the substrate and the reflector. A force of the second fixing member restricting the substrate and the reflector is greater at a center portion of the reflector 4 in the longitudinal direction than at a portion of the reflector 4 separated in the longitudinal direction from the center portion.

12 Claims, 20 Drawing Sheets

(56) References Cited

U.S. PATENT DOCUMENTS

| | | | | |
|---|---|---|---|---|
| 2011/0221978 A1* | 9/2011 | Hisada | .............. | G02F 1/133604 |
| | | | | 362/396 |
| 2012/0044714 A1* | 2/2012 | Lee | ...................... | G02B 6/0088 |
| | | | | 362/609 |
| 2014/0168564 A1* | 6/2014 | Lee | ...................... | G06F 1/1601 |
| | | | | 349/58 |
| 2014/0204575 A1* | 7/2014 | Jo | ...................... | G02F 1/133606 |
| | | | | 362/235 |
| 2014/0307474 A1* | 10/2014 | Kim | ...................... | G02B 6/0093 |
| | | | | 362/613 |
| 2015/0268506 A1* | 9/2015 | Hsiao | ................ | G02F 1/133308 |
| | | | | 349/58 |
| 2018/0067252 A1* | 3/2018 | Edamitsu | ................ | G02B 6/005 |
| 2020/0159073 A1* | 5/2020 | Kyoukane | ......... | G02F 1/133603 |

FOREIGN PATENT DOCUMENTS

| | | |
|---|---|---|
| JP | 2019-139869 A1 | 8/2019 |
| JP | 2020-053405 A | 4/2020 |
| WO | 2009/093361 A1 | 7/2009 |

OTHER PUBLICATIONS

International Search Report for corresponding International Application No. PCT/JP2021/024247 dated Aug. 3, 2021.
Written Opinion for corresponding International Application No. PCT/JP2021/024247 dated Aug. 3, 2021.

* cited by examiner

PLANAR ILLUMINATION DEVICE

CROSS REFERENCE TO RELATED APPLICATIONS

This application claims the benefit of priority to Japanese Patent Application Number 2020-134427 filed on Aug. 7, 2020. The entire contents of the above-identified application are hereby incorporated by reference.

TECHNICAL FIELD

The disclosure relates to a planar illumination device.

BACKGROUND

A so-called direct-type planar illumination device used as a backlight or the like of a vehicle-mounted liquid crystal display device is known. The type of planar illumination device includes a substrate with a plurality of light sources disposed at one surface side, a reflector provided at the one surface side of the substrate, and a bottom frame provided at a surface opposite to the one surface of the substrate.

In some planar illumination devices, a substrate through-hole is provided at the substrate, a reflector through-hole is provided at the reflector, a pin configured to engage with the through-hole and the reflector through-hole is provided at one surface of the bottom frame, and the substrate and the reflector are fixed to the bottom frame (for example, JP 2013-246988 A).

Further, in the planar illumination devices, when a space (gap) exists between the reflector and the substrate, light from the light source enters the space, causing light loss. Therefore, to suppress light loss, in some planar illumination devices, the reflector is fixed to the substrate by double-sided tape in a manner that a space is not formed between the reflector and the substrate.

The double-sided tape in the conventional planar illumination device is, for example, disposed at a given interval along outer peripheries of the reflector and the substrate.

SUMMARY

However, a linear expansion coefficient of the reflector and a linear expansion coefficient of the substrate (or frame with the substrate fixed to the frame) are different in a usage environment of a planar illumination device mounted to a vehicle (for example, −40° C. to 95° C. for in-vehicle use). Therefore, when a temperature change in the vehicle occurs, a length (amount of change) of the reflector in a longitudinal direction and a length (amount of change) of the substrate in the longitudinal direction differ, and the reflector may warp to one surface side of the substrate or warp to the other surface side of the substrate about a center portion in the longitudinal direction, causing the reflector to detach from the substrate.

In light of the foregoing, an object of the disclosure is to provide a planar illumination device capable of stably fixing a reflector to a substrate, even when a temperature change occurs.

To solve the problems described above and to achieve the object, a planar illumination device according to an aspect of the disclosure includes a substrate provided with a plurality of light sources at one surface side, a reflector provided at the one surface side of the substrate, a bottom frame provided at a surface side of the substrate opposite to the one surface side, a first fixing member configured to fix a center portion of the reflector in a longitudinal direction to the bottom frame, and a second fixing member configured to fix the one surface of the substrate and the reflector. A force of the second fixing member restricting the substrate and the reflector is greater at a center portion of the reflector in the longitudinal direction than at a portion of the reflector separated in the longitudinal direction from the center portion.

A planar illumination device according to an aspect of the disclosure can stably fix a reflector to a substrate even when a temperature change occurs.

DESCRIPTION OF EMBODIMENTS

First Embodiment

Figure 1:
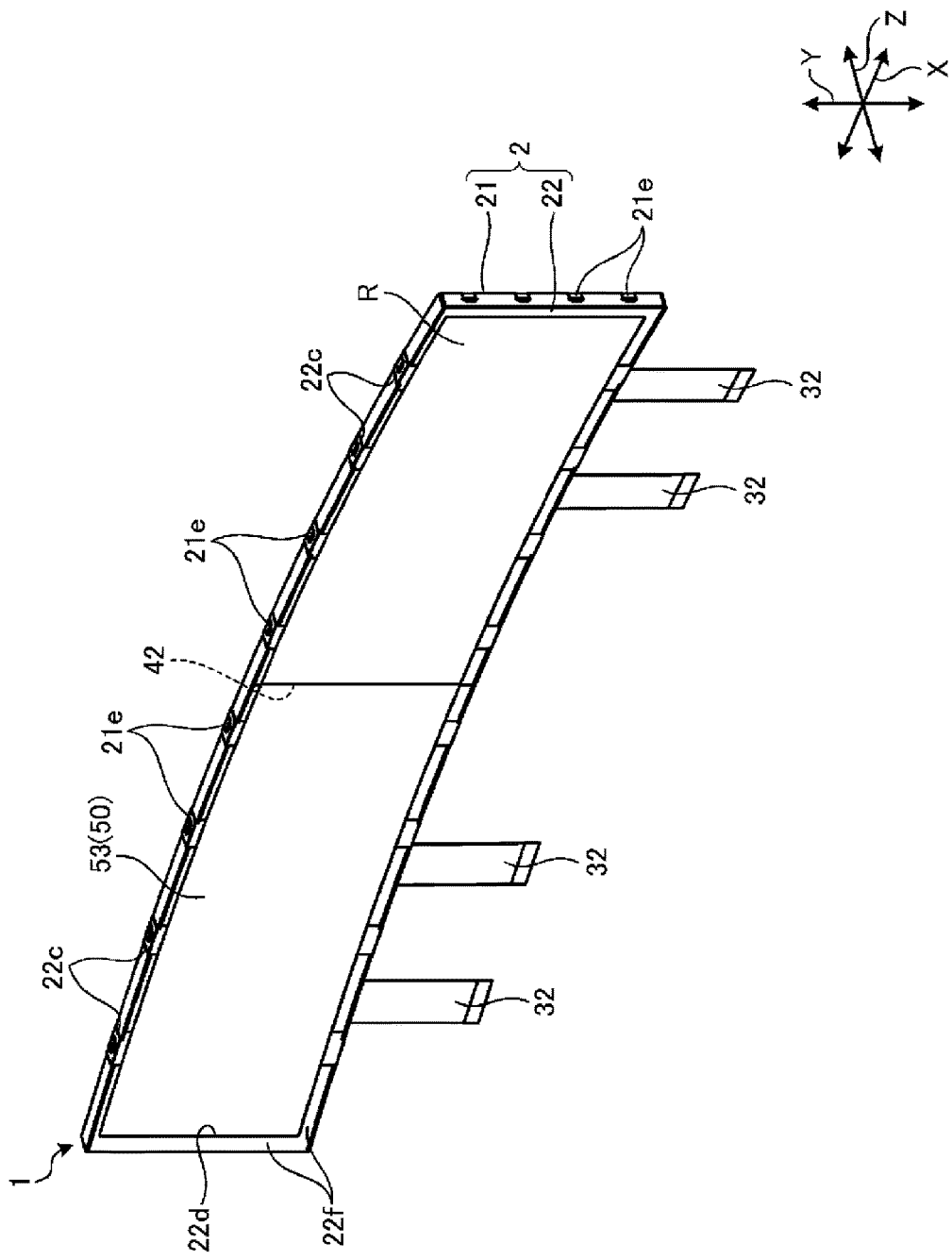
FIG. 1 is a perspective view of a planar illumination device according to an embodiment, as viewed from a front side.

A planar illumination device 1 according to a first embodiment will be described below with reference to the drawings. Note that the disclosure is not limited by the following embodiments. Furthermore, the dimensional relationships between elements, proportions of the elements, and the like in the drawings may differ from reality. Among the drawings, parts having mutually different dimensional relationships and proportions may be included. Further, the contents described in one embodiment are similarly applied in principle to other embodiments.

Figure 2:
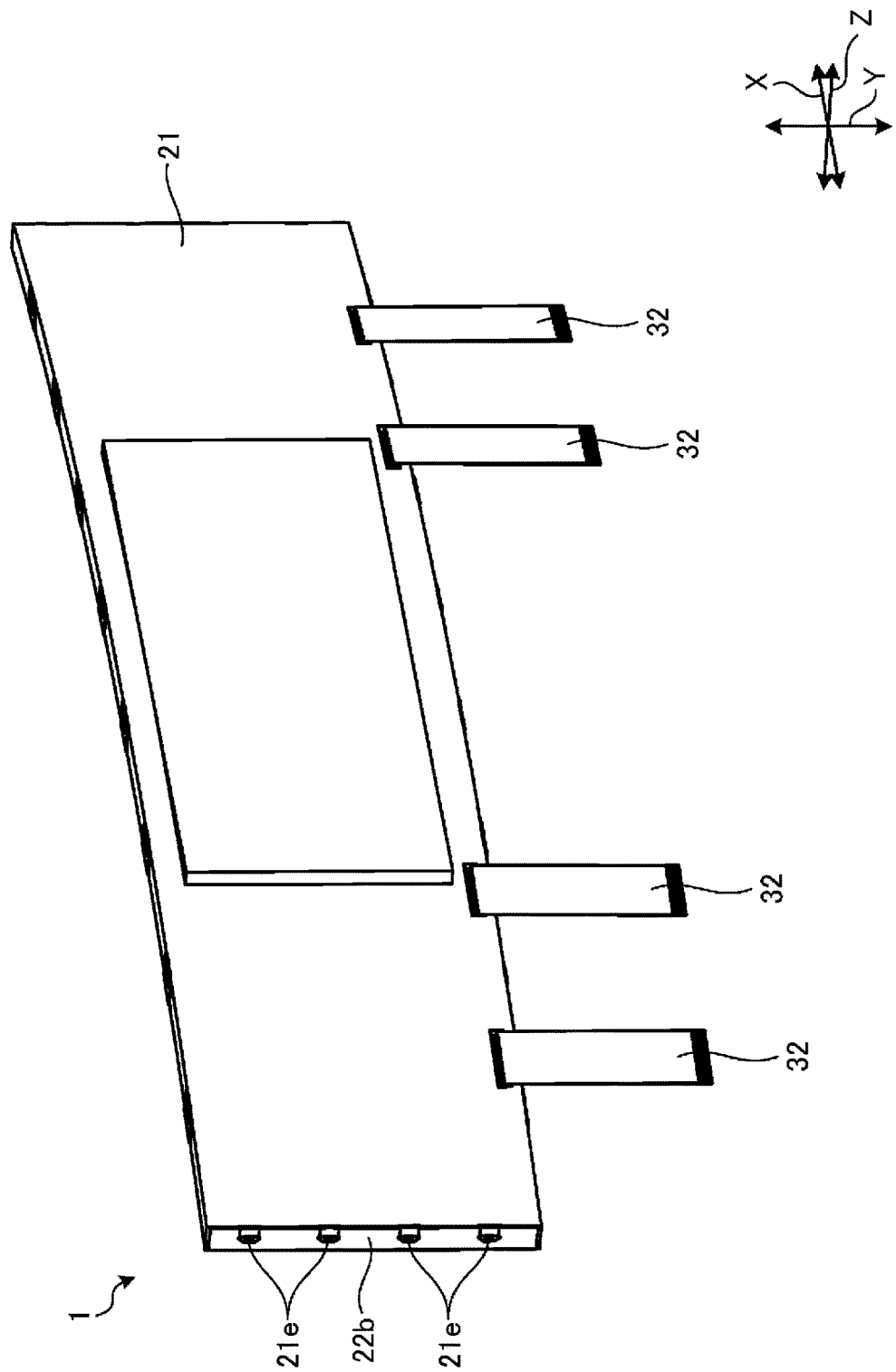
FIG. 2 is a perspective view of the planar illumination device of FIG. 1, as viewed from a rear side.
Figure 3:
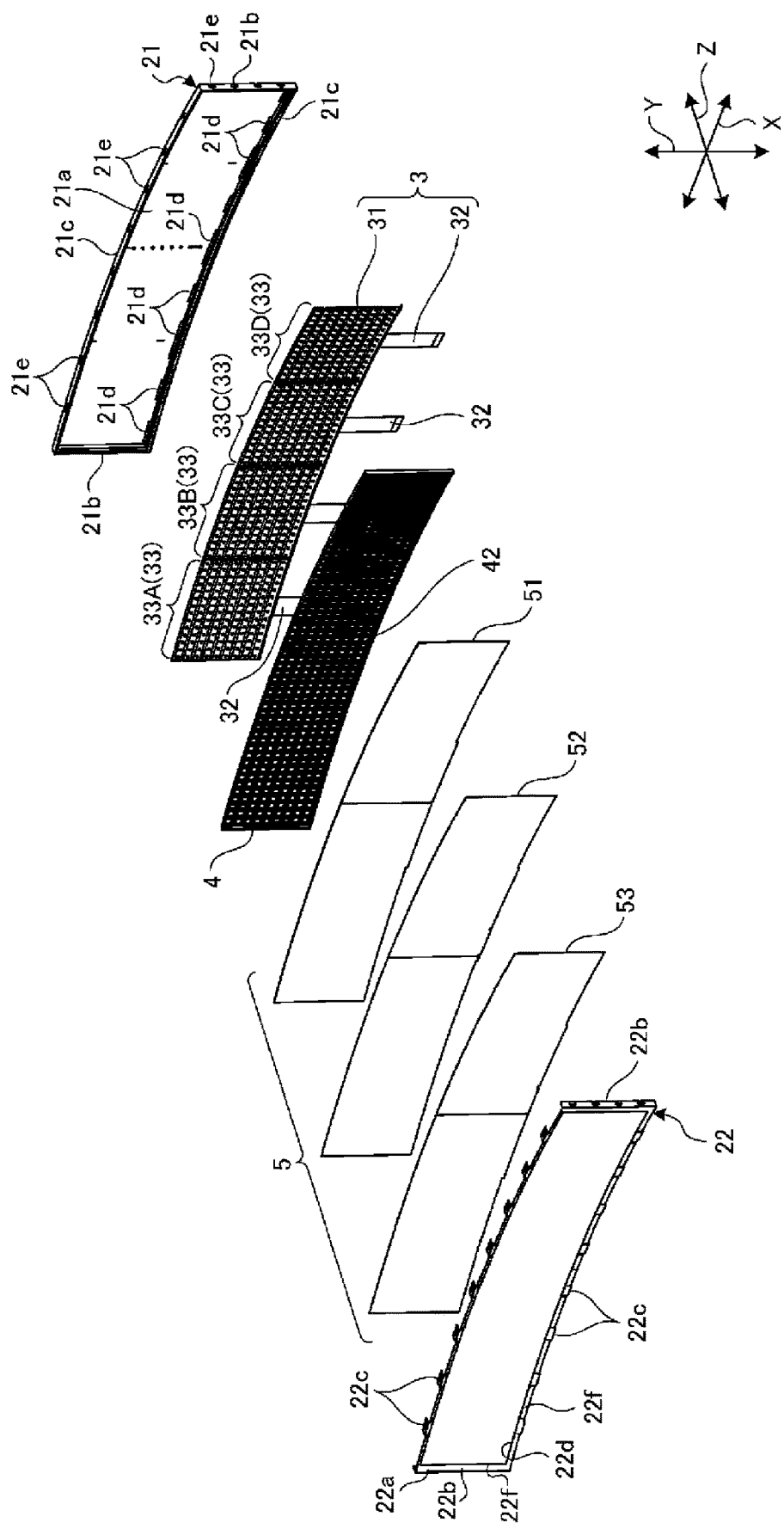
FIG. 3 is an exploded perspective view of the planar illumination device.

First, an overall configuration of the planar illumination device 1 according to the embodiment will be described using FIG. 1 to FIG. 3. FIG. 1 is a perspective view of the planar illumination device 1 according to the first embodiment, as viewed from a front side. FIG. 2 is a perspective view of the planar illumination device 1 according to the first embodiment, as viewed from a rear side. FIG. 3 is an exploded perspective view of the planar illumination device 1 according to the first embodiment. In FIG. 1 to FIG. 3, for the sake of convenience, a longitudinal direction of the planar illumination device 1 is an X-axis direction, a lateral direction is a Y-axis direction, and a thickness direction is a Z-axis direction.

The planar illumination device 1 according to the embodiment is an illumination device used as a backlight for various types of liquid crystal display devices, and is a so-called direct-type planar illumination device 1 with a light source 30 described below disposed directly below an exit surface R. A liquid crystal display device as the target of the planar illumination device 1 is, for example, a display of an electronic meter, an indicator, or the like mounted in a vehicle.

As illustrated in FIG. 1, the planar illumination device 1 according to the embodiment includes the exit surface R defined by an opening portion 22d of a top frame 22 described below. The planar illumination device 1 emits light from the exit surface R and functions as a backlight for the liquid crystal display device described above. Further, the exit surface R of the planar illumination device 1 according to the present embodiment is curved with respect to a plane orthogonal to the thickness direction.

Figure 6:
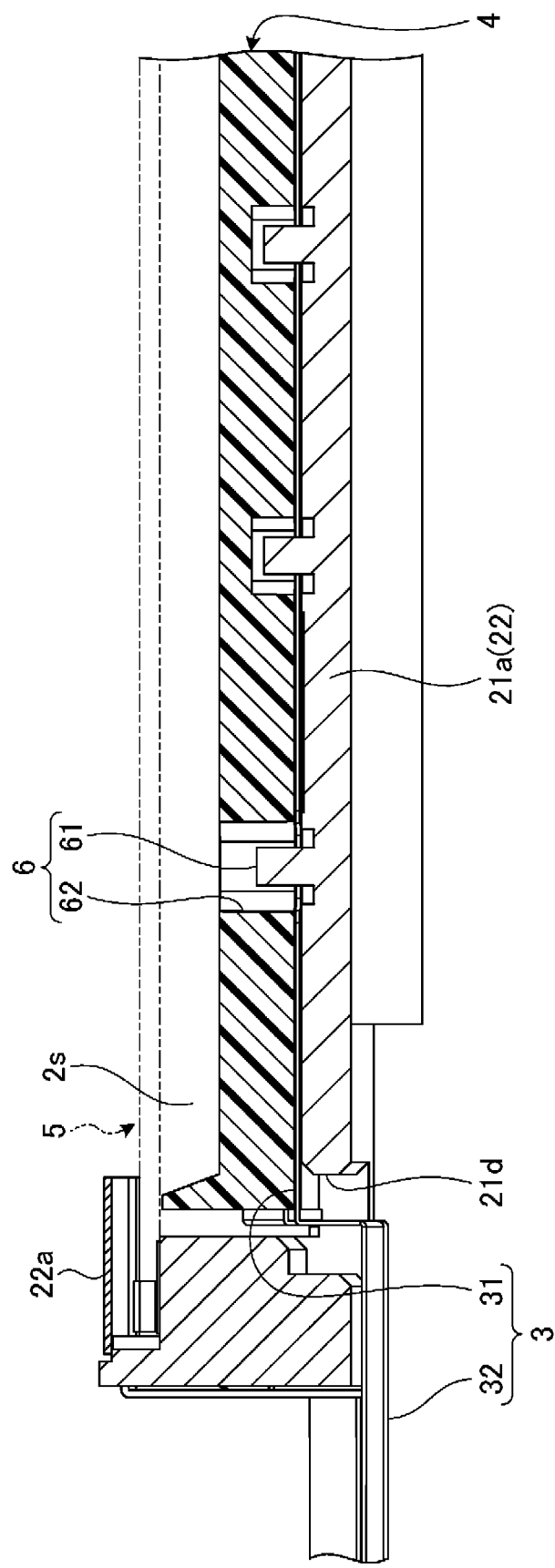
FIG. 6 is a cross-sectional view taken along a line A-A in FIG. 4.
Figure 7:
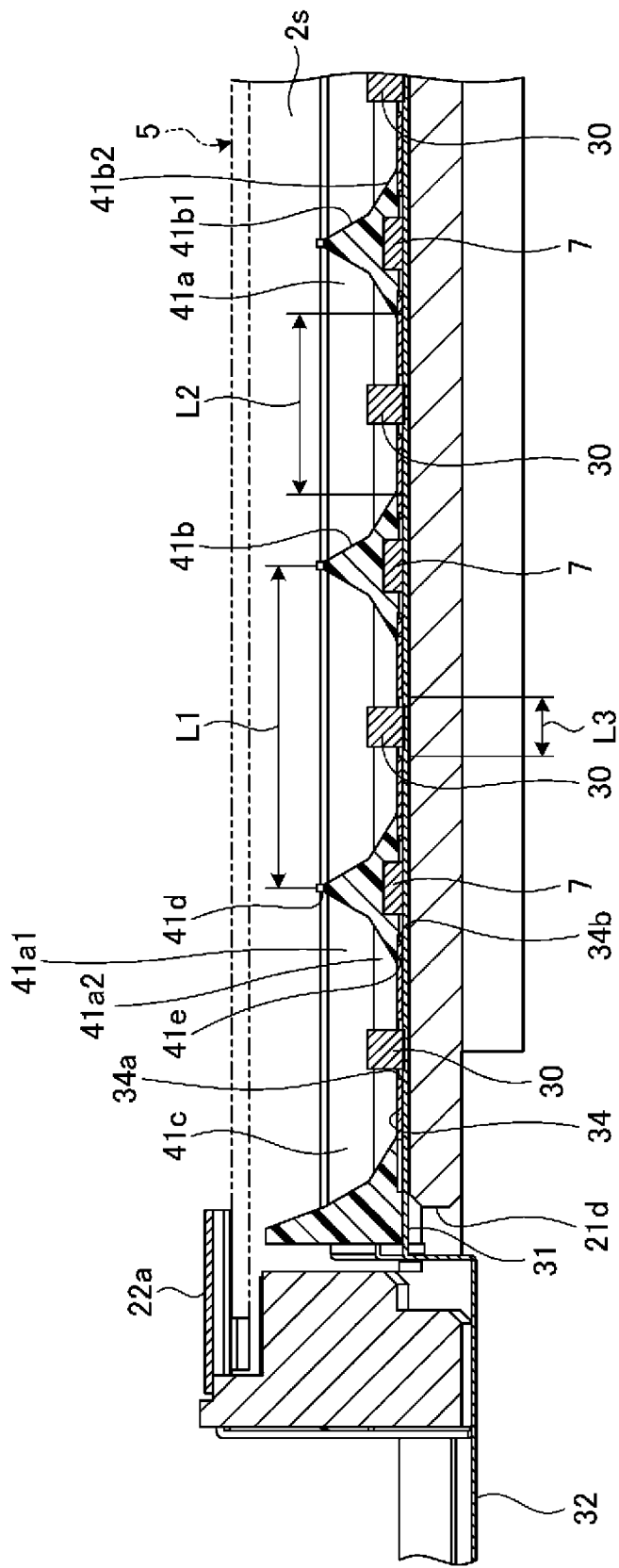
FIG. 7 is a cross-sectional view taken along a line B-B in FIG. 5.

The planar illumination device 1 according to the embodiment includes a frame 2, a substrate 3, a reflector 4, an optical sheet 5, a first fixing member 6, and a second fixing member 7, as illustrated in FIG. 3, FIG. 6, and FIG. 7.

The frame 2 is, for example, a housing made of stainless steel having high rigidity. Note that the frame 2 may be formed of aluminum, magnesium, or the like. The frame 2 includes a bottom frame 21 and the top frame 22, and accommodates a substrate main body part 31 of the substrate 3, the reflector 4, and the optical sheet 5 in an internal space 2s (refer to FIG. 6, FIG. 7, and the like) formed by the bottom frame 21 and the top frame 22.

The bottom frame 21 is formed in a bottomed box shape, and functions as a base of the frame 2. Further, the bottom frame 21 includes a bottom part 21a, a pair of first side walls 21b, and a pair of second side walls 21c. The bottom part 21a has a rectangular shape when viewed from the front side, and defines a front view shape of the planar illumination device 1. A through-hole 21d passing through the bottom part 21a in the thickness direction is formed at the bottom part 21a. The through-hole 21d is disposed at intervals in the longitudinal direction. The pair of first side walls 21b oppose each other in the longitudinal direction and are continuous in the lateral direction. The pair of second side walls 21c oppose each other in the lateral direction and are continuous in the longitudinal direction. An engagement claw 21e protruding outwardly is formed at outer peripheral surfaces of the pair of first side wall 21b and outer peripheral surfaces of the pair of second side wall 21c (refer to FIG. 3 and FIG. 5). The engagement claw 21e is provided at intervals in the longitudinal direction, and is provided at intervals in the lateral direction.

The top frame 22 is disposed at an exiting direction side of the light, the exiting direction side being one surface side of the bottom frame 21 in the thickness direction, and functions as a lid of the frame 2. Further, the top frame 22 is constituted by a top plate 22a, a pair of first side walls 22b, and a pair of second side walls 22c. The top plate 22a is formed with the opening portion 22d at a center part, and the exit surface R described above is defined by such an opening portion 22d. In other words, the top frame 22 includes a frame edge part 22f formed with the opening portion 22d, as a frame opening, at an inner side. The pair of first side walls 22b oppose each other in the longitudinal direction and are continuous in the lateral direction. The pair of second side walls 22c oppose each other in the lateral direction and are disposed at intervals in the longitudinal direction. Engagement holes 22e engageable with the engagement claws 2e described above are provided at the pair of second side walls 22c (refer to FIG. 5). Then, in the frame 2, the top frame 22 is assembled to the bottom frame 21 by engagement of the engagement claws 21e with the engagement holes 22e, forming the internal space 2s (refer to FIG. 6 and FIG. 7).

The substrate 3 is a circuit board composed of, for example, an epoxy resin or a polyimide (PI), and a flexible printed circuit (FPC) board, for example, can be employed. The substrate 3 is provided at the one surface of the bottom frame 21 in the thickness direction. In other words, the planar illumination device 1 includes the bottom frame 21 provided at a side opposite to one surface of the substrate 3. Further, a plurality of light sources 30 are provided at the one surface side of the substrate 3 (refer to FIG. 4). In other words, the planar illumination device 1 includes the substrate 3 with the plurality of light sources 30 provided at the one surface side.

As illustrated in FIG. 3, the substrate 3 of the present embodiment is divided into a plurality of regions 33 in the longitudinal direction. More specifically described, the substrate 3 is configured to be divided into four regions 33A, 33B, 33C, 33D in the longitudinal direction.

Such a substrate 3 includes the substrate main body part 31, and an external connection part 32 extending from the substrate main body part 31 to one side in the lateral direction. The substrate main body part 31 includes the plurality of light sources 30. The external connection part 32 is an area connecting a circuit configured to control illumination of the light sources 30 and an external device (for example, an electronic control unit (ECU) of the vehicle).

Figure 4:
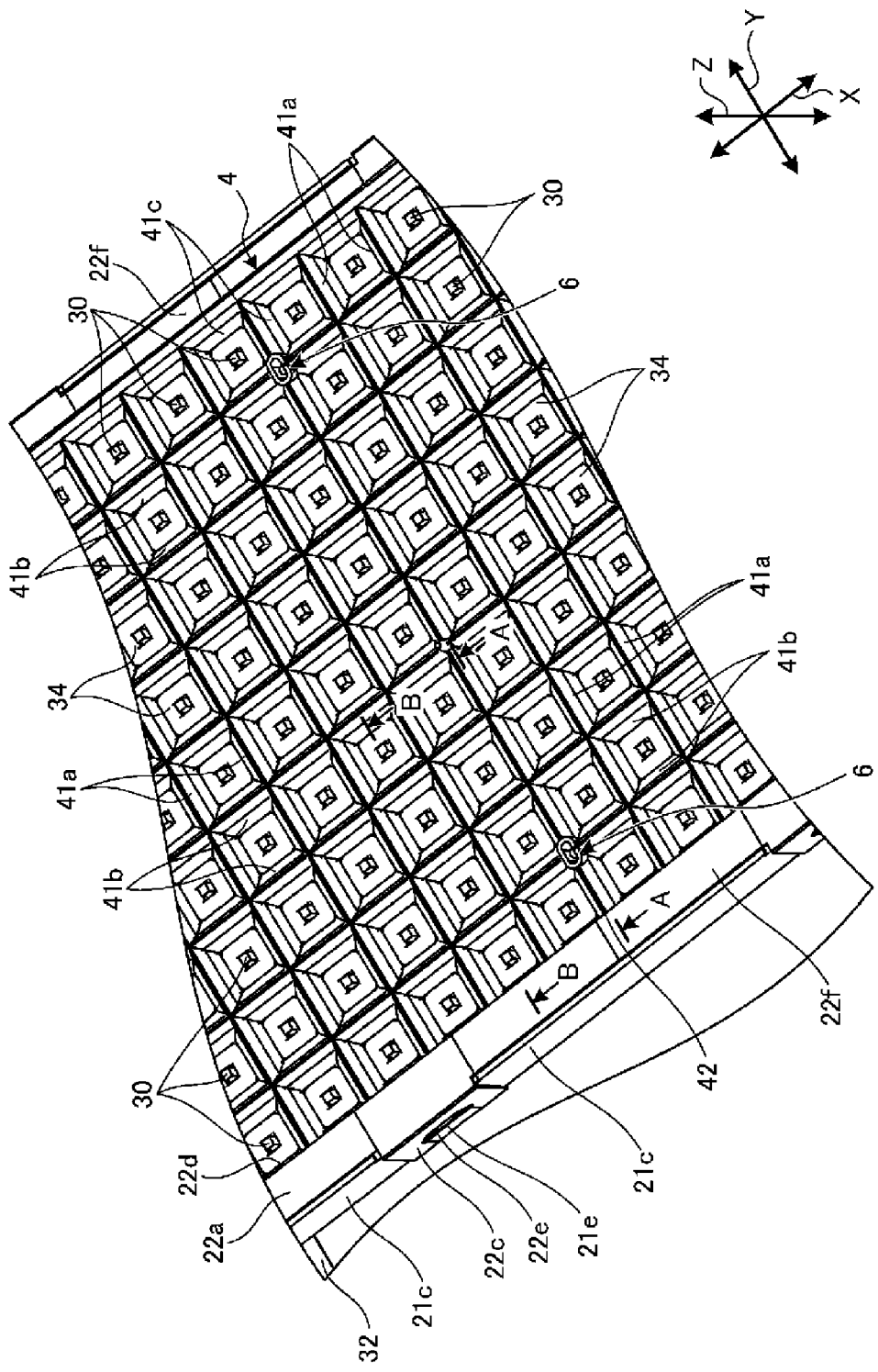
FIG. 4 is a front view of a reflector with an optical sheet removed.
Figure 5:
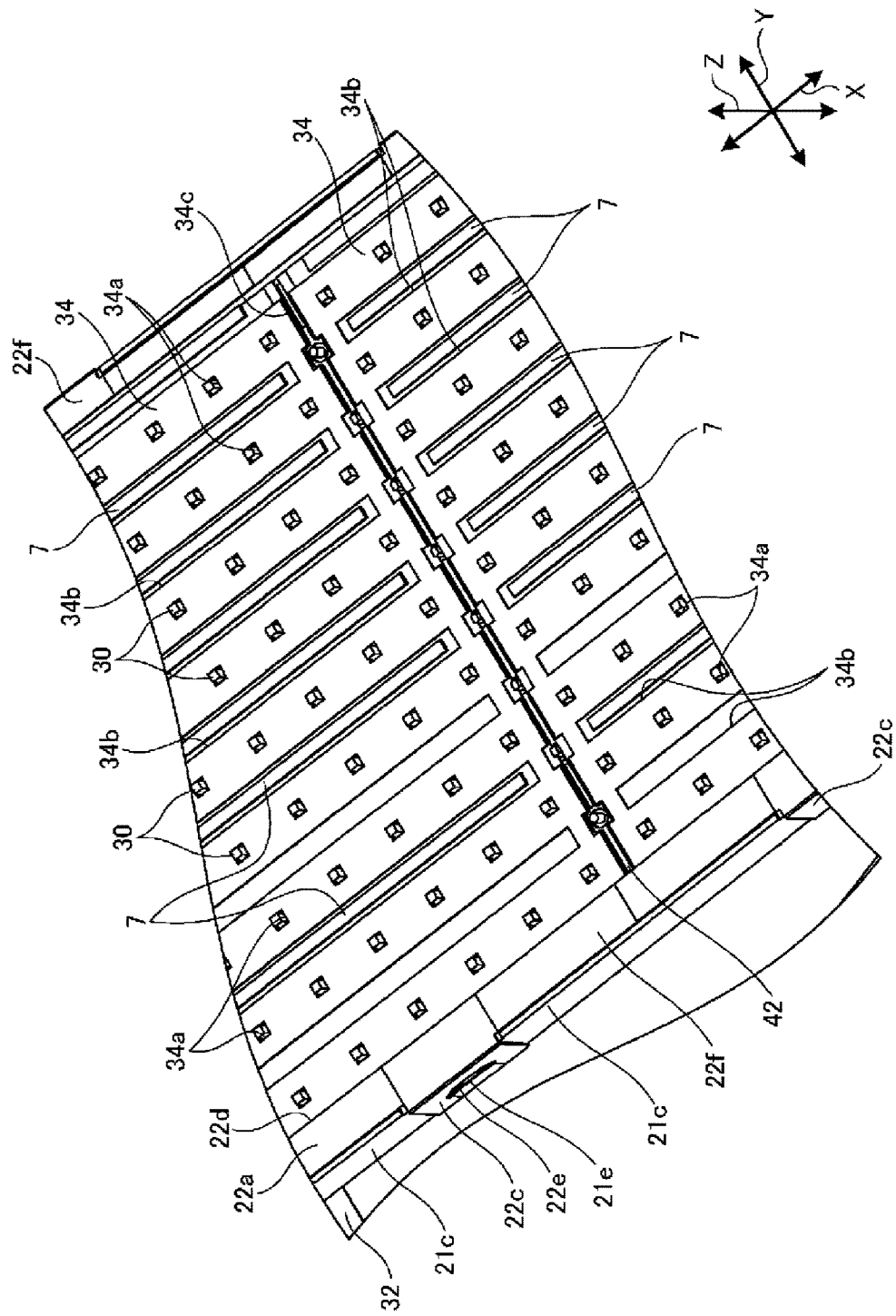
FIG. 5 is a front view of a substrate with the optical sheet and the reflector removed.

As illustrated in FIG. 4, FIG. 5, and FIG. 7, the substrate 3 includes a reflective sheet 34 at the one surface side in the thickness direction. The reflective sheet 34 has a function of reflecting once again, to the exit surface R side, light exiting from the light sources 30 and reflected by the optical sheet 5. As the reflective sheet 34, for example, a multilayer film sheet, a foamed white reflector, a white polyethylene terephthalate film, or a silver reflective sheet having a reflectance of 85% or higher can be used. The reflective sheet 34 includes a first sheet opening 34a exposing a head part of the light source 30 to the one surface side. The first sheet opening 34a is formed in a square shape, for example. The reflective sheet 34 includes a second sheet opening 34b (opening) at a disposed position of the second fixing member 7 described below. The second sheet opening 34b is formed in a rectangular shape, for example. The reflective sheet 34 of the present embodiment is formed correspondingly to the plurality of regions 33 of the substrate 3, for example. That is, the reflective sheet 34 is formed divided into the four regions 33. Then, as illustrated in FIG. 5, the reflective sheet 34 is provided with a gap 34c between one region 33 and another region 33. A pin of the first fixing member 6 is disposed at the gap 34c.

The light source 30 is a point light source 30 and, for example, a light-emitting diode (LED) can be employed. As the light source 30, for example, a package-type LED or a chip-type LED can be used, but the light source 30 is not limited to these types. Note that the light source 30 is not limited to an LED, and any light-emitting member can be employed.

The light sources 30 of the planar illumination device 1 according to the present embodiment are disposed at a given pitch in the longitudinal direction and arrayed at a given pitch in the lateral direction, for example. That is, the light sources 30 of the planar illumination device 1 according to the present embodiment are disposed in a lattice pattern at equal intervals vertically and horizontally. For example, 56 light sources 30 are disposed with six disposed in the lateral direction and nine disposed in the longitudinal direction.

The reflector 4 is formed of synthetic resin, for example, has a function of reflecting the light emitted from the light sources 30 to the exit surface R side and increasing a luminance of the exit surface R, and can improve an emission efficiency of the planar illumination device 1. The reflector 4 is provided at the one surface side of the substrate 3 in the thickness direction. In other words, the planar illumination device 1 includes the reflector 4 provided at the one surface side of the substrate 3. The reflector 4 according to the present embodiment is integrally formed by, for example, injection molding synthetic resin. That is, the planar illumination device 1 of the present embodiment includes one reflector 4.

Further, the reflector 4 is formed with reflecting parts 41 having a lattice pattern corresponding to each light source 30 mounted on the substrate 3. That is, six reflecting parts 41 of the reflector 4 of the present embodiment are disposed in the lateral direction, and nine are disposed in the longitudinal direction. As illustrated in FIG. 4, each reflecting part 41 includes a pair of first reflecting parts 41a opposing each other in the longitudinal direction, a pair of second reflecting parts 41b opposing each other in the lateral direction, and a space 41c formed by the pair of first reflecting parts 41a and the pair of second reflecting parts 41b (refer to FIG. 4 and FIG. 7). The second reflecting part 41b illustrated in FIG. 7 includes an exit surface-side reflecting surface 41b1 and a substrate-side reflecting surface 41b2 having angles with respect to a plane including the longitudinal direction and the lateral direction different from each other. Then, an intersection angle between the substrate-side reflecting surface 41b2 and the plane including the longitudinal direction and the lateral direction is less than an intersection angle between the exit surface-side reflecting surface 41b1 and the plane including the longitudinal direction and the lateral direction. Similarly, the first reflecting part 41a includes an exit surface-side reflecting surface 41a1 and a substrate-side reflecting surface 41a2 having angles with respect to a plane including the longitudinal direction and the lateral direction different from each other. Then, an intersection angle between the substrate-side reflecting surface 41a2 and the plane including the longitudinal direction and the lateral direction is less than an intersection angle between the exit surface-side reflecting surface 41a1 and the plane including the longitudinal direction and the lateral direction. The light source 30 is disposed at a center in the longitudinal direction and at a center in the lateral direction of the space 41c illustrated in FIG. 4 and FIG. 7, and a first reflector opening (reflector opening) 41d positioned at one surface side in the thickness direction (exit surface R side) and a second reflector opening 41e positioned at the other surface side (substrate 3 surface side including the light sources 30) are formed at the space 41c. The first reflector opening 41d is formed in a square shape, for example, and the second reflector opening 41e is formed in a square shape, for example. A size L1 of the first reflector opening 41d illustrated in FIG. 7 is larger than a size L2 of the second reflector opening 41e. Moreover, a size L3 of the first sheet opening (sheet opening) 34a of the reflective sheet 34 described above is smaller than the size L2 of the second reflector opening 41e.

The optical sheet 5 is disposed at one surface side of the reflector 4 in the thickness direction, as illustrated in FIG. 1 and FIG. 3. The planar illumination device 1 of the present embodiment includes, for example, three optical sheets 51, 52, 53. The optical sheet 5 adjusts a distribution and a luminance of light passing from the other surface side to the one surface side in the thickness direction, and equalizes the light exiting from the exit surface R, for example. For example, the optical sheet 51 is a diffusion sheet, the optical sheet 52 is a prism sheet, brightness enhancement film (BEF), or the like, and the optical sheet 53 is a reflective polarization film or a dual brightness enhancement film (DBEF).

As illustrated in FIG. 4 and FIG. 6, the first fixing member 6 fixes a center portion 42 of the reflector 4 in the longitudinal direction to the bottom frame 21. That is, the planar illumination device 1 of the present embodiment includes the first fixing member 6 configured to fix the center portion 42 of the reflector 4 in the longitudinal direction to the bottom frame 21. The first fixing member 6 includes, for example, a pin 61 protruding from one surface in the thickness direction of the bottom part 21a of the bottom frame 21, and an engagement hole 62 passing through the reflector 4 in the thickness direction and engageable with the pin 61. The engagement hole 62 is larger in size in a plane orthogonal to the thickness direction than a diameter of the pin and, when a temperature change in the vehicle occurs, allows the reflector 4 to move in the lateral direction relative to the bottom frame 21 while restricting the movement of the reflector 4 in the longitudinal direction relative to the bottom frame 21. The first fixing member 6 of the present embodiment is disposed at a position overlapping the center portion 42 of the reflector 4 in the longitudinal direction, at an inner side of the frame edge part 22f. Moreover, two first fixing members 6 in the present embodiment are disposed at overlapping positions of fixing centers with the center portion 42 of the reflector 4 in the longitudinal direction.

Figure 9:
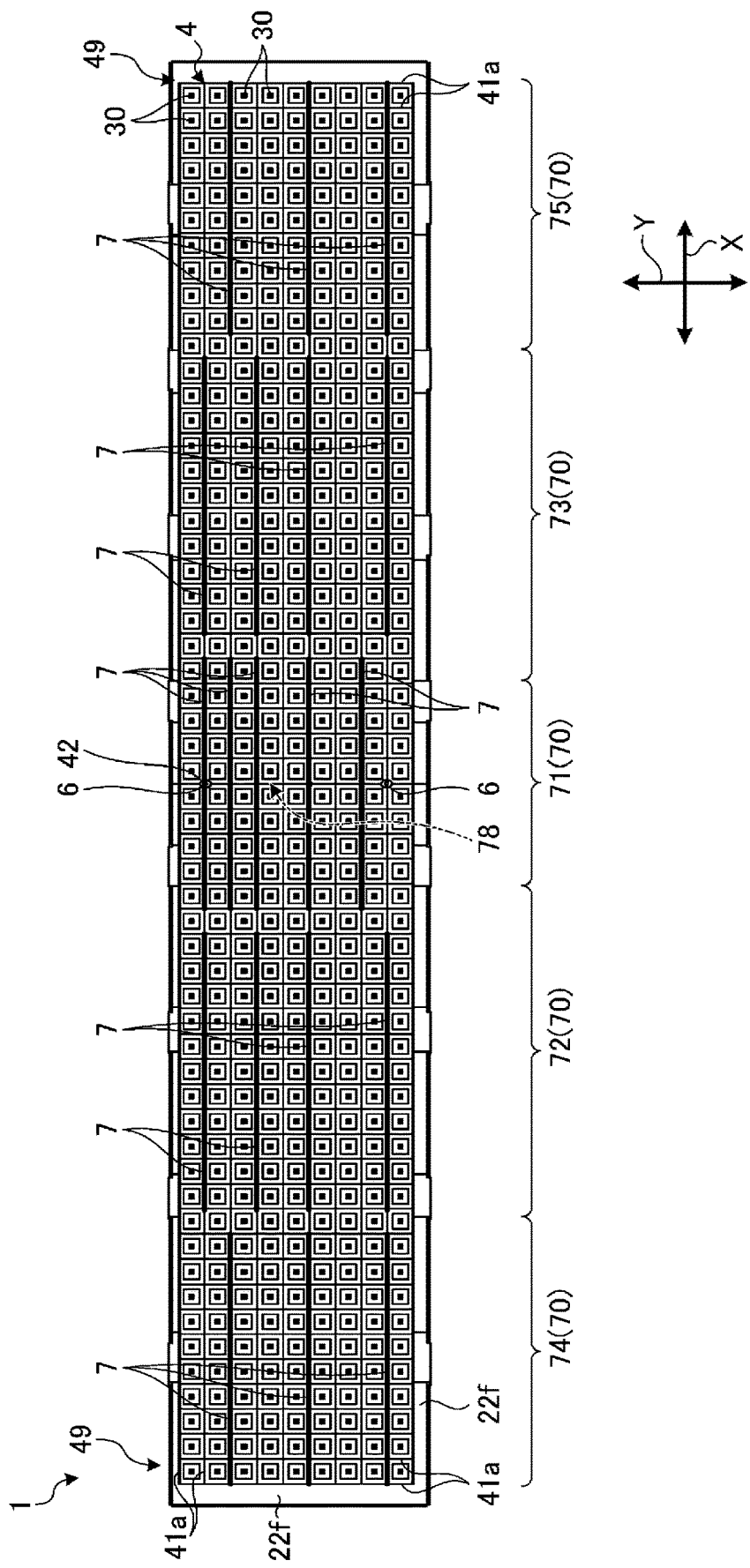
FIG. 9 is an explanatory view illustrating an example of an arrangement of the second fixing member.

As illustrated in FIG. 5, FIG. 7, and FIG. 9, the second fixing member 7 fixes the one surface of the substrate 3 and the reflector 4. That is, the planar illumination device 1 of the present embodiment includes the second fixing member 7 configured to fix the one surface of the substrate 3 and the reflector 4. The second fixing member 7 is, for example, double-sided tape.

Figure 8:
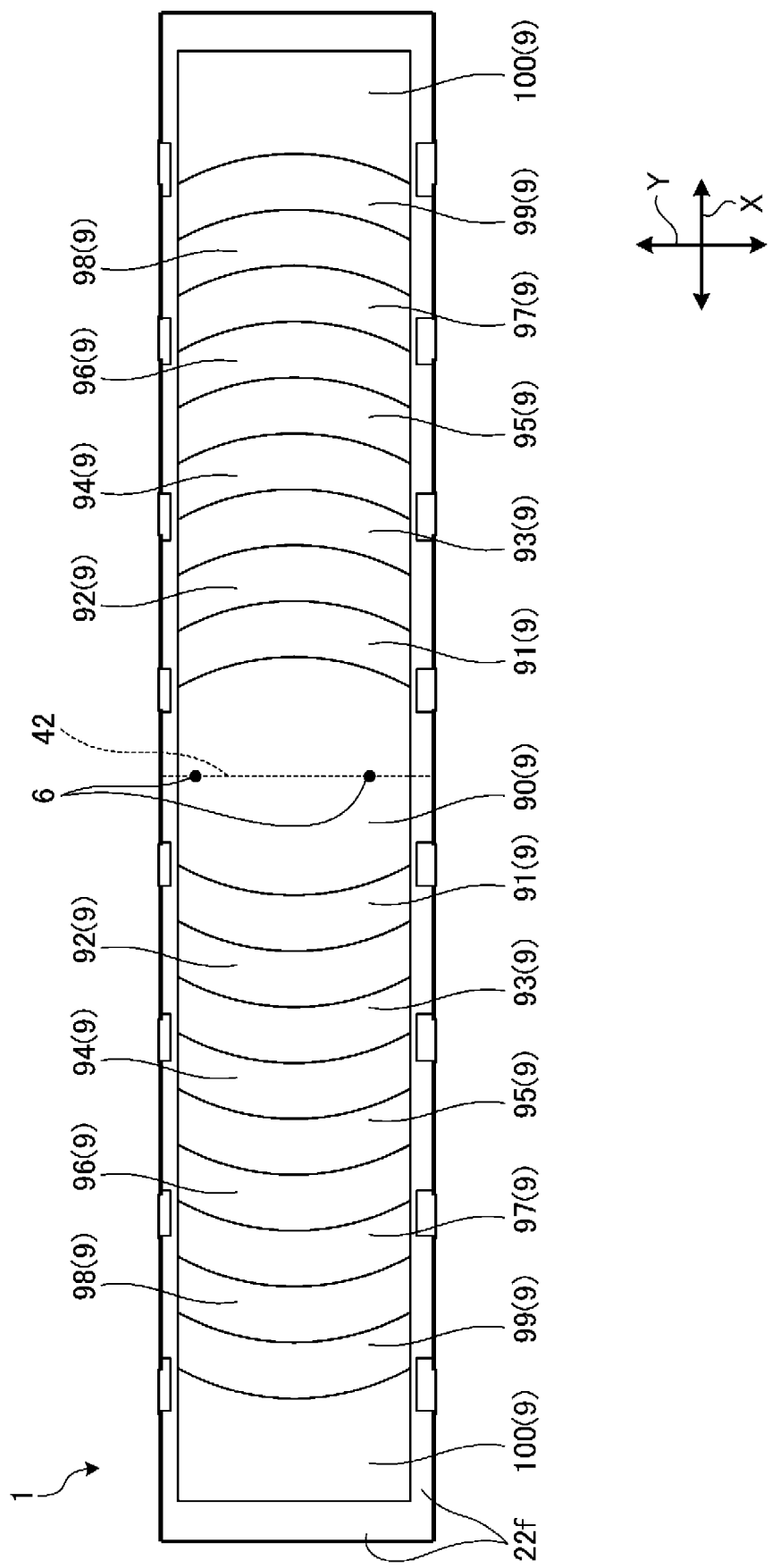
FIG. 8 is a conceptual diagram illustrating positions of first fixing members and a difference in a magnitude of a force of second fixing members fixing the substrate and the reflector.

FIG. 8 is a conceptual diagram illustrating positions of the first fixing members 6 and a difference in a magnitude of a force of the second fixing members 7 restricting the substrate 3 and the reflector 4. The force of the second fixing member 7 restricting the substrate 3 and the reflector 4 is, in the present embodiment, a force of the second fixing member 7 fixing the substrate 3 and the reflector 4. As illustrated in FIG. 8, the magnitude of the force of the second fixing member 7 fixing the substrate 3 and the reflector 4 is divided into a plurality of fixing regions 9 (in the present embodiment, 11 fixing regions 9) having fixing forces different from one another, for example. The magnitude of the force of the second fixing member 7 fixing the substrate 3 and the reflector 4 is greatest in, among the plurality of fixing regions 9, a first fixing region 90 positioned at the center portion 42 in the longitudinal direction, and second greatest in second fixing regions 91 adjacent to the first fixing region 90 in the longitudinal direction. Then, in the plurality of fixing regions 9, the magnitude of the force of the second fixing member 7 fixing the substrate 3 and the reflector 4 gradually decreases as a distance from the center portion 42 increases in the longitudinal direction.

FIG. 9 is a conceptual diagram illustrating an example of disposed positions of the second fixing member 7. The planar illumination device 1 of the present embodiment virtually divides an arrangement region 70 of the second fixing members 7 into five. Described in more detail, included are a first arrangement region 71 centrally positioned in the longitudinal direction, second arrangement regions 72, 73 adjacent to the first arrangement region 71 in the longitudinal direction, and third arrangement regions 74, 75 positioned at sides of the second arrangement regions 72, 73 opposite to the first arrangement region 71 in the longitudinal direction. Then, the second fixing members 7 are disposed symmetrically with respect to a center line bisecting the reflector 4 in the longitudinal direction.

The first arrangement region 71 includes five second fixing members 7 extending in the longitudinal direction, for example. The second arrangement regions 72, 73 include four second fixing members 7 extending in the longitudinal direction, for example. The third arrangement regions 74, 75 include three second fixing members 7 extending in the longitudinal direction, for example.

An adhesive strength per unit area of the second fixing member (double-sided tape) 7 of the planar illumination device 1 according to the present embodiment is the same in any portion. Moreover, a width orthogonal to a length direction of the second fixing member (double-sided tape) 7 is the same in any portion. Then, as described above, the arrangement of the second fixing member 7 differs according to the arrangement region 70, and an adhesion area of the first arrangement region 71 is the widest among the five arrangement regions 70. Further, the adhesion area of the second arrangement regions 72, 73 is wider than the area of the third arrangement regions 74, 75. That is, the adhesion area of the third arrangement regions 74, 75 is the narrowest among the adhesion areas of the five arrangement regions 70. That is, the second fixing member 7 of the planar illumination device 1 of the present embodiment has an adhesion area of the center portion 42 in the longitudinal direction with respect to the substrate 3 being wider than adhesion areas of portions separated in the longitudinal direction from the center portion 42 of the substrate 3. Then, the force of the second fixing member 7 fixing the substrate 3 and the reflector 4 is greater at the center portion 42 of the reflector 4 in the longitudinal direction than at portions 49 of the reflector 4 separated in the longitudinal direction from the center portion.

Figure 10:
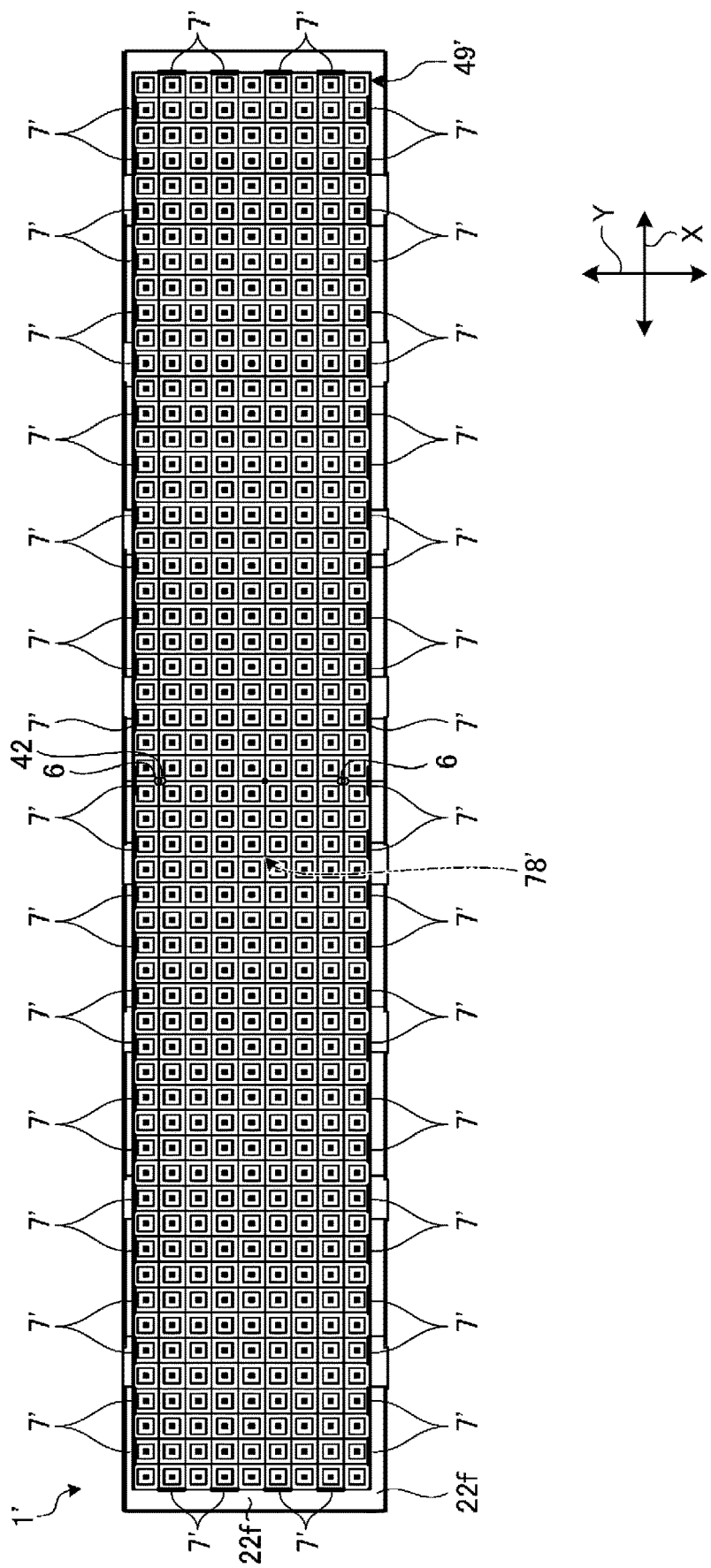
FIG. 10 is an explanatory view illustrating an arrangement of a second fixing member in a comparative example.

FIG. 10 is a conceptual diagram illustrating arrangement positions of second fixing members 7' of a planar illumination device 1' in a comparative example. The planar illumination device 1' is provided with the first fixing members 6 at a center portion in the longitudinal direction. Further, in the planar illumination device 1', the second fixing members 7' are disposed at a given interval along an outer periphery of the substrate 3.

When the second fixing members 7' are disposed in the described way, the force pressing the double-sided tape, serving as each second fixing member 7', onto the substrate 3 and the reflector 4 when each second fixing member 7' (double-sided tape) is affixed varies across the longitudinal direction, causing a difference in the force of each second fixing member 7' fixing the substrate 3 and the reflector 4, and the difference may cause a virtual fixing center 78' of the second fixing member 7' to shift in the longitudinal direction from the first fixing member 6 (pin). Then, when a temperature change in the vehicle occurs with the virtual fixing center 78' of the second fixing member 7' shifted from the first fixing member 6 in the longitudinal direction, stress may occur between the first fixing member 6 and the reflector 4, causing the first fixing member (pin) to break or the reflector 4 to crack.

In contrast, the planar illumination device 1 according to the embodiment includes the first fixing member 6 configured to fix the center portion 42 of the reflector 4 in the longitudinal direction to the bottom frame 21, and the second fixing member 7 configured to fix the one surface of the substrate 3 and the reflector 4. Then, the force (adhesion area) of the second fixing member 7 fixing the substrate 3 and the reflector 4 is greater at the center portion 42 of the reflector 4 in the longitudinal direction than at portions separated in the longitudinal direction from the center portion 42 of the reflector 4. Therefore, even if the force pressing the double-sided tape, serving as each second fixing member 7, onto the substrate 3 and the reflector 4 varies across the longitudinal direction, a virtual fixing center 78 (refer to FIG. 9) of the second fixing member 7 can be aligned with the fixing center of the first fixing member 6 to the extent possible. Therefore, the planar illumination device 1 according to the present embodiment can suppress the application of a great force to the first fixing member 6 due to a difference in linear expansion coefficients, even when a temperature change in the vehicle occurs. As a result, in the planar illumination device 1 according to the present embodiment, the reflector 4 can be stably fixed to the substrate 3 (without the occurrence of breakage or cracking) even when a temperature change in the vehicle occurs. Moreover, the second fixing members 7 firmly fix the reflector 4 to the substrate 3 at the center portion 42 in the longitudinal direction while fixing the reflector 4 to the substrate 3 to the extent of no separation between the reflector 4 and the substrate at portions separated in the longitudinal direction from the center portion 42 (portions including both end parts), even when a temperature change in the vehicle occurs. Note that, although the substrate 3 is fixed to the bottom frame 21 using double-sided tape, the difference between the linear expansion coefficient of the substrate 3 and the linear expansion coefficient of the bottom frame 21 is small, and the substrate 3 is divided into a plurality in the longitudinal direction. Therefore, problems caused by differences in linear expansion coefficients do not occur in the substrate 3 and the bottom frame 21. Further, the reflective sheet 34 is fixed to the substrate 3 using double-sided tape, but the difference between the linear expansion coefficient of the reflective sheet 34 and the linear expansion coefficient of the bottom frame 21 is small, and the reflective sheet 34 is divided into a plurality in the longitudinal direction. Therefore, problems caused by differences in linear expansion coefficients do not occur in the reflective sheet 34 and the bottom frame 21. On the other hand, although the reflector 4 is difficult to divide in the longitudinal direction and the difference in linear expansion coefficients with the bottom frame 21 is large, according to the configuration described above, problems caused by the linear expansion coefficients do not occur.

Further, the second fixing member 7 of the planar illumination device 1 according to the present embodiment has an adhesion area of the center portion 42 in the longitudinal direction with respect to the substrate 3 being wider than the adhesion areas of portions of the substrate 3 separated in the longitudinal direction from the center portion 42. As a result, with changes in the arrangement of the second fixing members 7, the planar illumination device 1 according to the embodiment can achieve the actions and effects described above without provision of a complicated manufacturing process.

Incidentally, an edge-type planar illumination device can use a reflective sheet having high reflectance, while a direct-type planar illumination device can be made to reflect the light from the light sources by arranging the reflector 4 and printing the one surface side of the substrate in white. However, even when such printing in white is performed on the substrate, the substrate has a reflectance lower than the reflectance of the reflective sheet used in the edge-type planar illumination device due to requirements such as resistance in a high temperature mounting process. In particular, when an FPC is used for the substrate, bending resistance is also required in the substrate, possibly further reducing reflectance.

In response, the planar illumination device 1 according to the embodiment is configured so that the reflective sheet 34 separate from the substrate 3 is disposed overlapping the substrate 3, and thus the first sheet opening (sheet opening) 34a exposing the head part of the light source 30 is provided at the reflective sheet 34 and the size of the first sheet opening (sheet opening) 34a is made smaller than the size of the second reflector opening 41e. In the described way, the planar illumination device 1 according to the present embodiment can cause the light reflected by the optical sheet 5 to be reflected again to the extent possible by the reflective sheet 34 at the one surface side. As a result, the planar illumination device 1 according to the present embodiment can improve the efficiency of the luminance. Note that, even when the reflective sheet 34 is disposed overlapping, the planar illumination device 1 may be configured so that a white resist layer is provided at the one surface side of the substrate 3, and the light is reflected at the one surface side, even at the substrate 3 exposed from the first sheet openings 34a of the reflective sheet 34.

Further, the planar illumination device 1 according to the embodiment uses the sheet described above as the reflective sheet 34, and thus the linear expansion coefficient of the reflective sheet 34 is closer to the linear expansion coefficient of the substrate 3 than to the linear expansion coefficient of the reflector 4. In the described way, the planar illumination device 1 according to the present embodiment can prevent the reflective sheet 34 from peeling from the substrate 3 even when a temperature change in the vehicle occurs.

Furthermore, the reflective sheet 34 includes the second sheet opening 34b (opening) at disposed positions of the second fixing members 7. Thus, in the planar illumination device 1 according to the present embodiment, a wasteful reflective sheet 34 positioned at the bottom surface of the reflector 4 is not disposed. As a result, the planar illumination device 1 according to the present embodiment can suppress waste of the material of the reflective sheet 34.

The embodiment of the disclosure has been described above, but the disclosure is not limited to the embodiment described above, and various modifications are possible without departing from the spirit of the disclosure.

Second Embodiment

Figure 11:
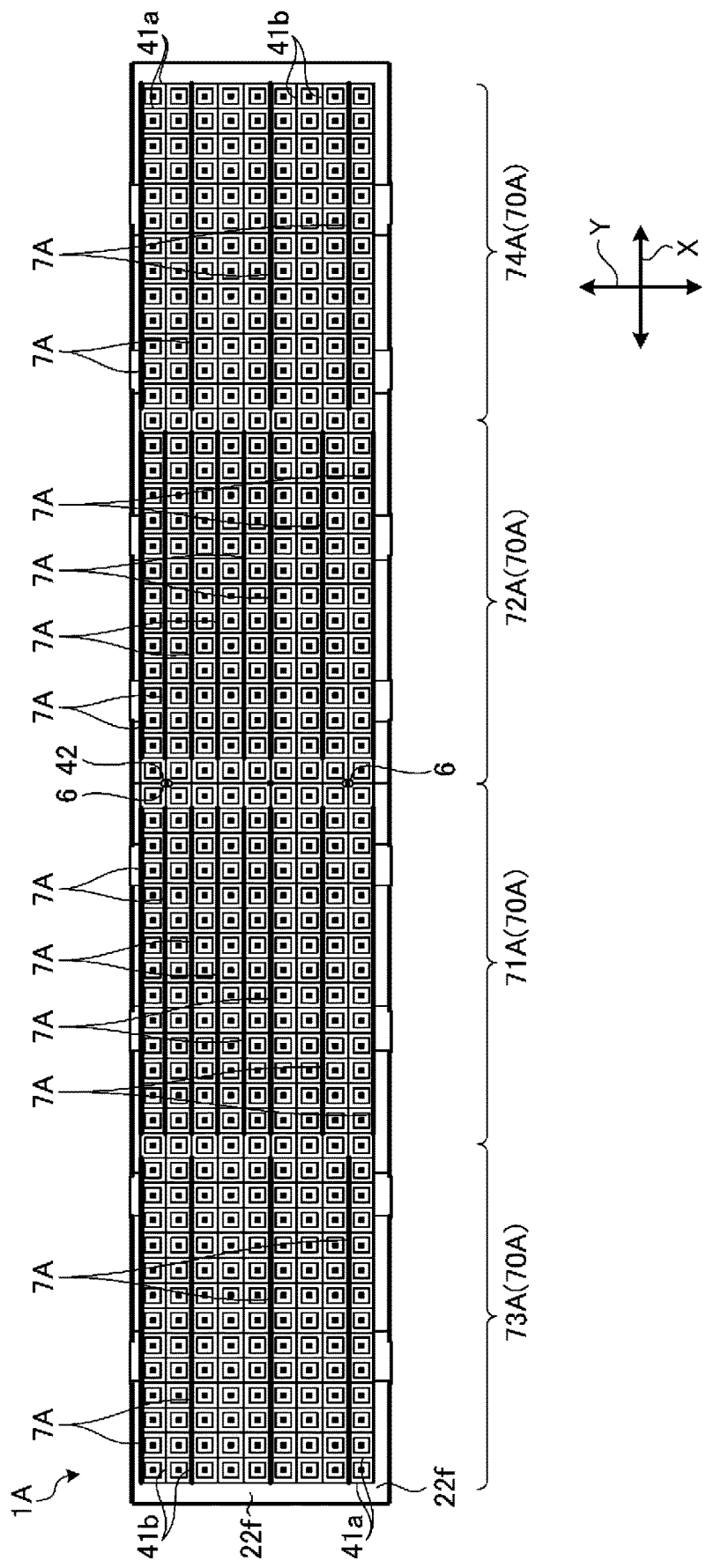
FIG. 11 is an explanatory view illustrating another example of an arrangement of a second fixing member.

FIG. 11 is a conceptual diagram similar to FIG. 9 illustrating an example of arrangement positions of a second fixing member 7A in a planar illumination device 1A of a second embodiment. The planar illumination device 1A according to the second embodiment described below is an example of other arrangement positions of the second fixing member 7A differing from the arrangement of the second fixing member 7 in the planar illumination device 1 according to the first embodiment. That is, the planar illumination device 1A according to the second embodiment differs from the planar illumination device 1 according to the first embodiment in the arrangement of the second fixing member 7A while other configurations are the same.

The planar illumination device 1A of the present embodiment divides an arrangement region 70A of the second fixing member 7A into four. Described in more detail, included are first arrangement regions 71A, 72A centrally positioned in the longitudinal direction, and second arrangement regions 73A, 74A adjacent to the first arrangement regions 71A, 72A in the longitudinal direction. The plurality of arrangement regions 70A divided into four in relation to the second fixing members 7 respectively correspond to the plurality of regions 33 constituting the substrate 3 described above. More specifically described, the first arrangement region 71A corresponds to the region 33B, the first arrangement region 72A corresponds to the region 33C, the second arrangement region 73A corresponds to the region 33A, and the second arrangement region 74A corresponds to the region 33D.

The first arrangement regions 71A, 72A include, for example, eight second fixing members 7A extending in the longitudinal direction. The eight second fixing members 7A disposed at the first arrangement regions 71A, 72A have the same length in the longitudinal direction. The second arrangement regions 73A, 74A include four second fixing members 7A extending in the longitudinal direction, for example. The four second fixing members 7A disposed at the second arrangement regions 73A, 74A have the same length in the longitudinal direction. Then, the second fixing members 7A are disposed symmetrically with respect to the center line bisecting the reflector 4 in the longitudinal direction, and a fixing center of the second fixing members 7A is the center portion 42 in the longitudinal direction and coincides with the fixing center of the first fixing member 6.

An adhesive strength per unit area of the second fixing member (double-sided tape) 7A of the planar illumination device 1A according to the present embodiment is the same in any portion. Moreover, a width orthogonal to a length direction of the second fixing member (double-sided tape) 7A is the same in any portion. Then, adhesion areas of, among the four arrangement regions 71A, 72A, 73A, 74A, the first arrangement regions 71A, 72A are wider than adhesion areas of the second arrangement regions 73A, 74A. That is, the second fixing member 7A of the planar illumination device 1A of the present embodiment has an adhesion area of the center portion 42 in the longitudinal direction with respect to the substrate 3 being wider than adhesion areas of portions separated in the longitudinal direction from the center portion 42 of the substrate 3. Then, a force of the second fixing members 7A fixing the substrate 3 and the reflector 4 is greater at the center portion 42 of the reflector 4 in the longitudinal direction than at portions of the reflector 4 separated in the longitudinal direction from the center portion 42.

Further, the substrate 3 of the planar illumination device 1A of the present embodiment is configured to be divided into the plurality of regions 33 in the longitudinal direction, and the second fixing members 7A are double-sided tape and change in arrangement in accordance with each position of the plurality of regions 33. In the described way, the planar illumination device 1A according to the present embodiment can provide the second fixing member 7A in each region 33 narrow in area with the substrate 3 divided into the plurality of regions 33, and thus the task of providing the second fixing member 7A at the substrate 3 can be easily performed.

Third Embodiment

Figure 12:
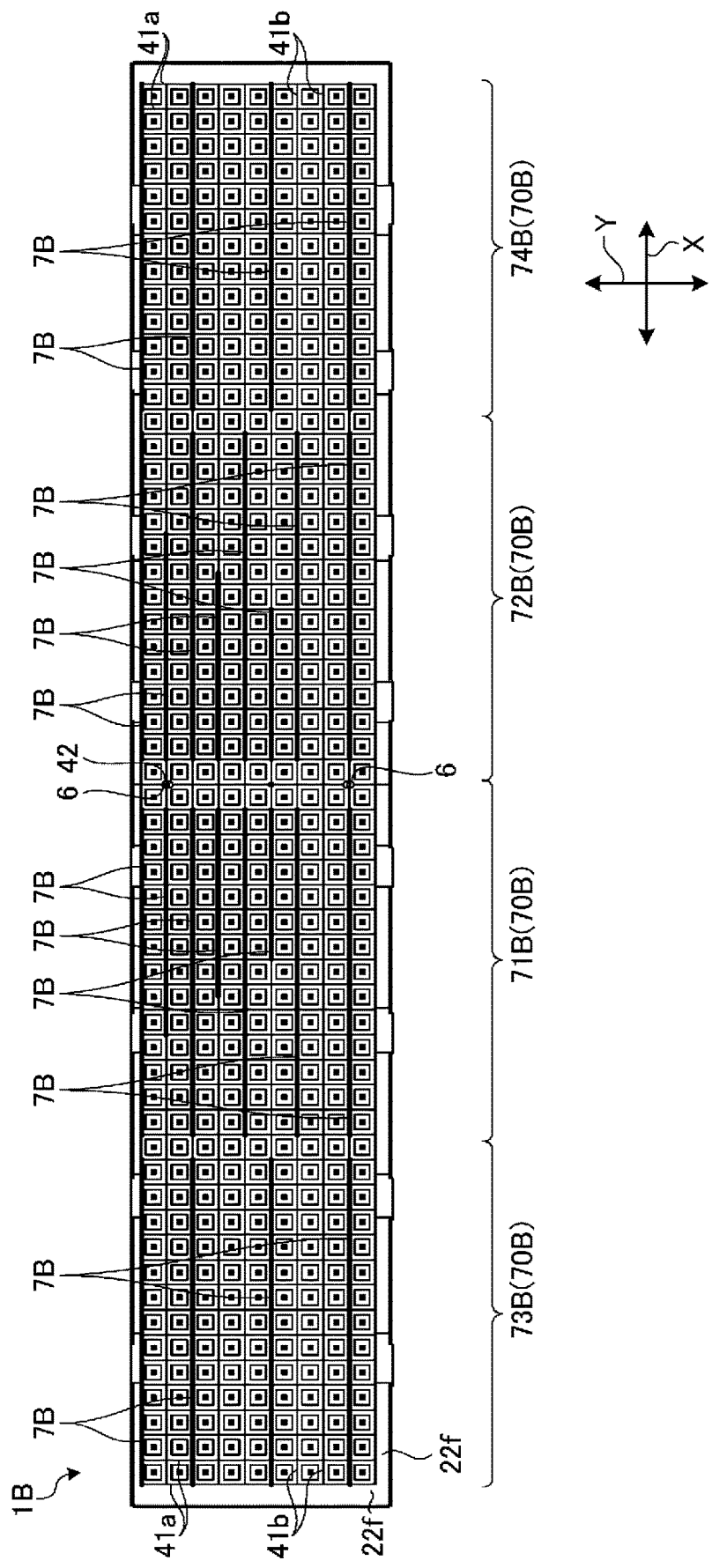
FIG. 12 is an explanatory view illustrating yet another example of an arrangement of a second fixing member.

FIG. 12 is a conceptual diagram similar to FIG. 9 illustrating an example of arrangement positions of a second fixing member 7B in a planar illumination device 1B of a third embodiment. The planar illumination device 1B according to the third embodiment described below is an example of other arrangement positions of the second fixing member 7B differing from the arrangement of the second fixing member 7 in the planar illumination device 1 according to the first embodiment. That is, the planar illumination device 1B according to the third embodiment differs from the planar illumination device 1 according to the first embodiment in the arrangement of the second fixing member 7B while other configurations are the same.

The planar illumination device 1B of the present embodiment divides an arrangement region 70B of the second fixing member 7B into four. Described in more detail, included are first arrangement regions 71B, 72B centrally positioned in the longitudinal direction, and second arrangement regions 73B, 74B adjacent to the first arrangement regions 71B, 72B in the longitudinal direction. The plurality of arrangement regions 70B divided into four in relation to the second fixing members 7B respectively correspond to the plurality of regions 33 constituting the substrate 3 described above. More specifically described, the first arrangement region 71B corresponds to the region 33B, the first arrangement region 72B corresponds to the region 33C, the second arrangement region 73B corresponds to the region 33A, and the second arrangement region 74B corresponds to the region 33D.

The first arrangement regions 71B, 72B include, for example, eight second fixing members 7B extending in the longitudinal direction. In FIG. 12, with regard to the second fixing members 7B disposed at the first arrangement regions 71B, 72B, lengths in the longitudinal direction of the second fixing members 7B disposed first, third, fifth, seventh, and eighth from above are longer than lengths in the longitudinal direction of the second fixing members 7B disposed second, fourth, and sixth. The second arrangement regions 73B, 74B include four second fixing members 7B extending in the longitudinal direction, for example. The four second fixing members 7B disposed at the second arrangement regions 73B, 74B have the same length in the longitudinal direction.

Then, the second fixing members 7B are disposed symmetrically with respect to the center line bisecting the reflector 4 in the longitudinal direction.

An adhesive strength per unit area of the second fixing member (double-sided tape) 7B of the planar illumination device 1B according to the present embodiment is the same in any portion. Moreover, a width orthogonal to a length direction of the second fixing member (double-sided tape) 7B is the same in any portion. Then, adhesion areas of, among the four arrangement regions 71B, 72B, 73B, 74B, the first arrangement regions 71B, 72B are wider than adhesion areas of the second arrangement regions 73B, 74B. That is, the second fixing member 7B of the planar illumination device 1B of the present embodiment has an adhesion area of the center portion 42 in the longitudinal direction with respect to the substrate 3 being wider than adhesion areas of portions separated in the longitudinal direction from the center portion 42 of the substrate 3. Then, a force of the second fixing member 7B fixing the substrate 3 and the reflector 4 is greater at the center portion 42 of the reflector 4 in the longitudinal direction than at portions of the reflector 4 separated in the longitudinal direction from the center portion 42.

In addition, by using the second fixing member 7B short in length in the longitudinal direction, it is possible to finely adjust the adhesion area, in other words, the adhesive strength, of the reflector 4 with respect to the substrate 3. As a result, for example, the adhesion area (adhesive strength) of the center portion 42 can be increased or the adhesion area (adhesive strength) on one side in the lateral direction in one arrangement region can be increased.

Fourth Embodiment

Figure 13:
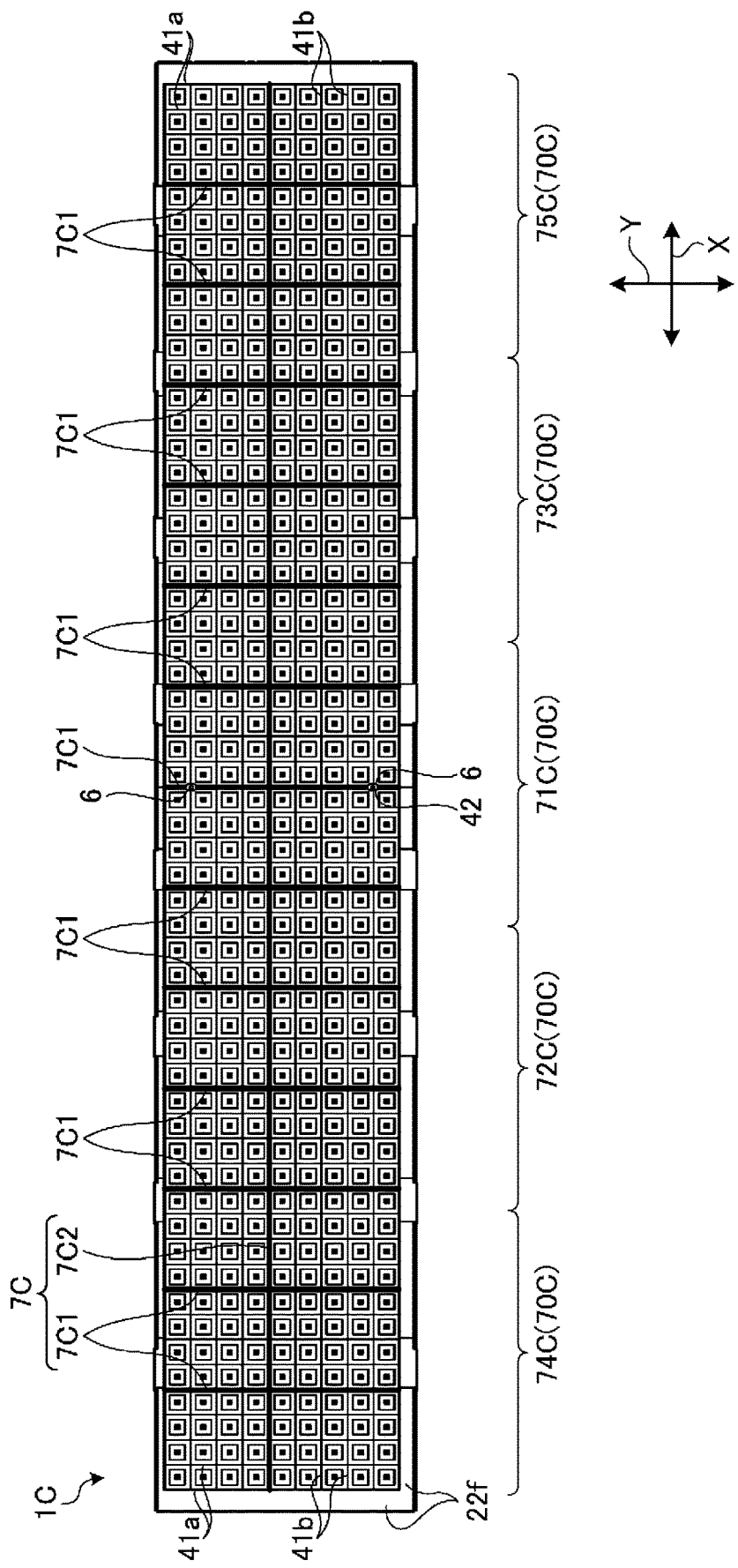
FIG. 13 is an explanatory view illustrating yet another example of an arrangement of a second fixing member.

FIG. 13 is a conceptual diagram similar to FIG. 9 illustrating an example of arrangement positions of a second fixing member 7C in a planar illumination device 1C of a fourth embodiment. The planar illumination device 1C according to the fourth embodiment described below is an example of other arrangement positions of the second fixing member 7C differing from the arrangement of the second fixing member 7 in the planar illumination device 1 according to the first embodiment. That is, the planar illumination device 1C according to the fourth embodiment differs from the planar illumination device 1 according to the first embodiment in the arrangement of the second fixing member 7C and in the adhesive strength per unit area of the second fixing member 7C while other configurations are the same.

The planar illumination device 1C of the present embodiment divides an arrangement region 70C of the second fixing member 7C into five. Described in more detail, included are a first arrangement region 71C centrally positioned in the longitudinal direction, second arrangement regions 72C, 73C adjacent to the first arrangement region 71C in the longitudinal direction, and third arrangement regions 74C, 75C positioned on sides of the second arrangement regions 72C, 73C opposite to the first arrangement region 71C in the longitudinal direction.

Further, the second fixing member 7C includes lateral-direction extending second fixing members 7C1 extending in the lateral direction and disposed at the same interval in the longitudinal direction, and a longitudinal-direction extending second fixing member 7C2 extending in the longitudinal direction. The second fixing member 7C is, for example, double-sided tape. Moreover, a width orthogonal to a length direction of the second fixing member (double-sided tape) 7C is the same in any portion. The planar illumination device 1C of the present embodiment includes, for example, 13 lateral-direction extending second fixing members 7C1 extending in the lateral direction and, for example, one longitudinal-direction extending second fixing member 7C2 extending in the longitudinal direction. The second fixing member 7C of the present embodiment has an adhesive strength per unit area at the center portion 42 in the longitudinal direction with respect to the substrate 3 being greater than adhesive strengths per unit area at portions separated in the longitudinal direction from the center portion 42 of the substrate 3.

More specifically described, the second fixing member 7C disposed at the first arrangement region 71C has an adhesive strength per unit area with respect to the substrate 3 being greater than adhesive strengths per unit area with respect to the substrate 3 of the second fixing members 7C disposed at the other arrangement regions 72C, 73C, 74C, 75C.

Further, the second fixing members 7C disposed at the second arrangement regions 72C, 73C have adhesive strengths per unit area with respect to the substrate 3 being greater than adhesive strengths per unit area with respect to the substrate 3 of the second fixing members 7C disposed at the third arrangement regions 74C, 75C.

As described above, the second fixing member 7C of the planar illumination device 1C according to the embodiment is double-sided tape and has an adhesive strength per unit area at the center portion 42 in the longitudinal direction with respect to the substrate 3 being greater than the adhesive strengths per unit area at portions of the substrate 3 separated in the longitudinal direction from the center portion 42. As a result, with changes in the adhesive strength per unit area of the double-sided tape, the planar illumination device 1C according to the present embodiment can achieve the actions and effects described above without provision of a complicated manufacturing process.

Note that the planar illumination device 1C in the embodiment described above is described as including a large number of second fixing members 7C extending in the lateral direction. However, the planar device according to the present embodiment is not limited to the large number extending in the direction, and may include a large number of second fixing members extending in the longitudinal direction. Further, the large number of second fixing members extending in the longitudinal direction may have a constant adhesive strength per unit area across the longitudinal direction.

Fifth Embodiment

Figure 14:
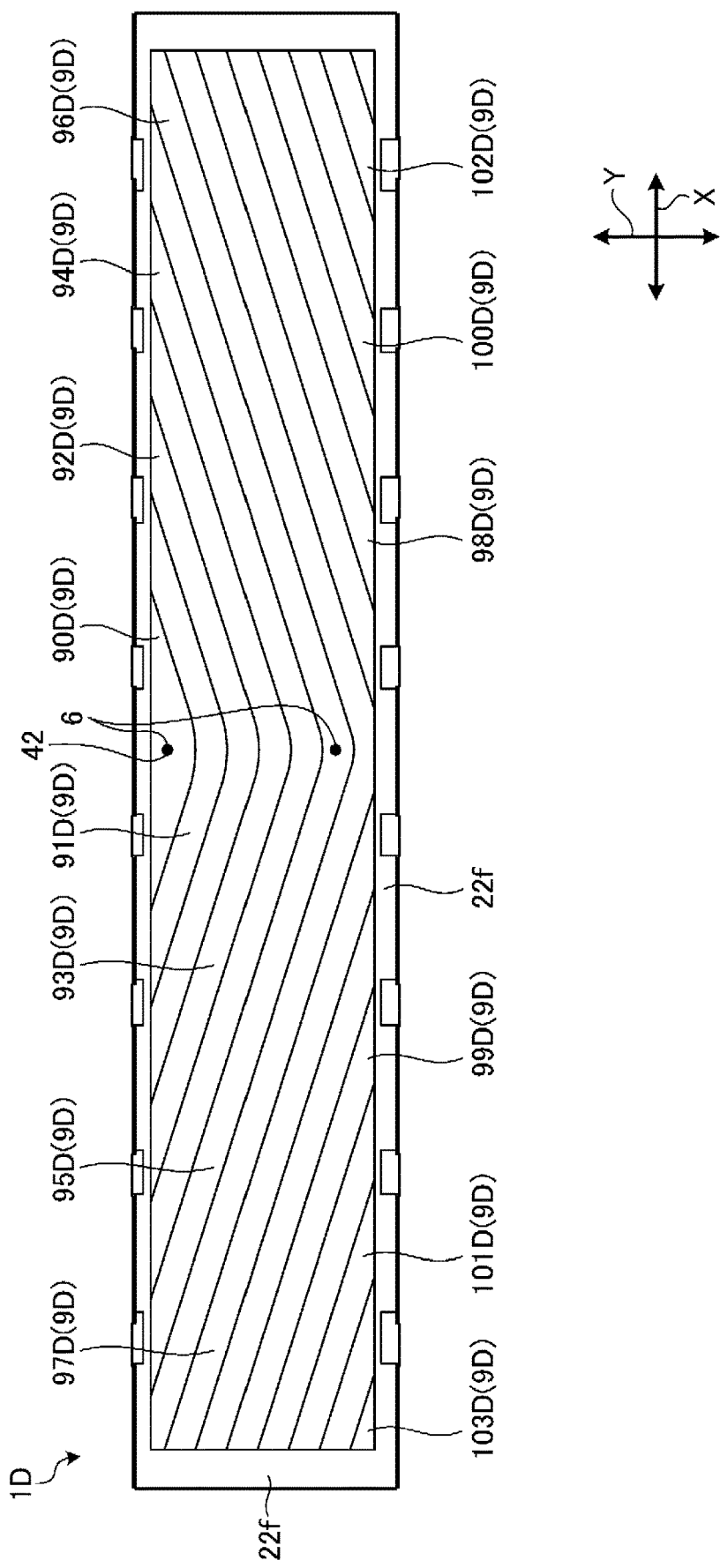
FIG. 14 is a conceptual diagram illustrating the positions of the first fixing members and a difference in a magnitude of a force of second fixing members fixing the substrate and the reflector.

FIG. 14 is a front view illustrating a planar illumination device 1D of another embodiment of the planar illumination device 1 according to the first embodiment. Described more specifically, FIG. 14 is a conceptual diagram illustrating the positions of the first fixing members 6 in the planar illumination device 1D and the difference in the magnitude of the force of the second fixing member 7 fixing the substrate 3 and the reflector 4. The planar illumination device 1D according to a fifth embodiment described below differs from the arrangement of the second fixing member 7 in the planar illumination device 1 according to the first embodiment, and thus the force fixing the substrate 3 and the reflector 4 varies depending on the position in the longitudinal direction and the position in the lateral direction. The planar illumination device 1D according to the fifth embodiment will be described below.

Of the two first fixing members 6 in the planar illumination device 1D according to the present embodiment, the first fixing member 6 positioned below in FIG. 14 is configured similarly to the first fixing member 6 in the first embodiment. On the other hand, the engagement hole 62 of, among the two first fixing members 6 in the planar illumination device 1D according to the present embodiment, the first fixing member 6 positioned above in FIG. 14 allows insertion of the pin 61 provided at the bottom frame 21, and is formed in a circular shape configured to restrict the movement of the reflector 4 in the longitudinal direction and the lateral direction with respect to the bottom frame 21 when a temperature change in the vehicle occurs.

In the planar illumination device 1D according to the present embodiment, as illustrated in FIG. 14, the magnitude of the force of the second fixing member 7 fixing the substrate 3 and the reflector 4 is divided into a plurality of fixing regions 9D (in the present embodiment, 14 fixing regions 9D) centered about the first fixing member 6 positioned above in FIG. 14 and having fixing forces different from one another, for example. The magnitude of the force of the second fixing member 7 fixing the substrate 3 and the reflector 4 is greatest in, among the plurality of fixing regions 9D, a first fixing region 90D positioned at the center portion 42 in the longitudinal direction, and second greatest in second fixing regions 91D adjacent to the first fixing region 90D in the longitudinal direction. Then, in the plurality of fixing regions 9D, the magnitude of the force of the second fixing member 7 fixing the substrate 3 and the reflector 4 gradually decreases as a distance from the center portion 42 increases in the longitudinal direction.

The engagement hole 62 of one first fixing member 6 (first fixing member 6 positioned above in FIG. 14) among the two first fixing members 6 allows insertion of the pin 61 and is formed in a circular shape configured to restrict the movement of the reflector 4 in the longitudinal direction and the lateral direction with respect to the bottom frame 21 when a temperature change in the vehicle occurs. The engagement hole 62 of the other first fixing member 6 (first fixing member 6 positioned below in FIG. 14) among the two first fixing members 6 allows insertion of the pin 61 and is formed into a long hole configured to allow movement of the reflector 4 in the lateral direction with respect to the bottom frame 21 when a temperature change in the vehicle occurs. As a result, when a temperature change in the vehicle occurs, the reflector 4 is permitted to expand and contract in the lateral direction and permitted to expand and contract in the longitudinal direction with the first fixing member positioned above in FIG. 14 as a fixing reference.

Sixth Embodiment

Figure 15:
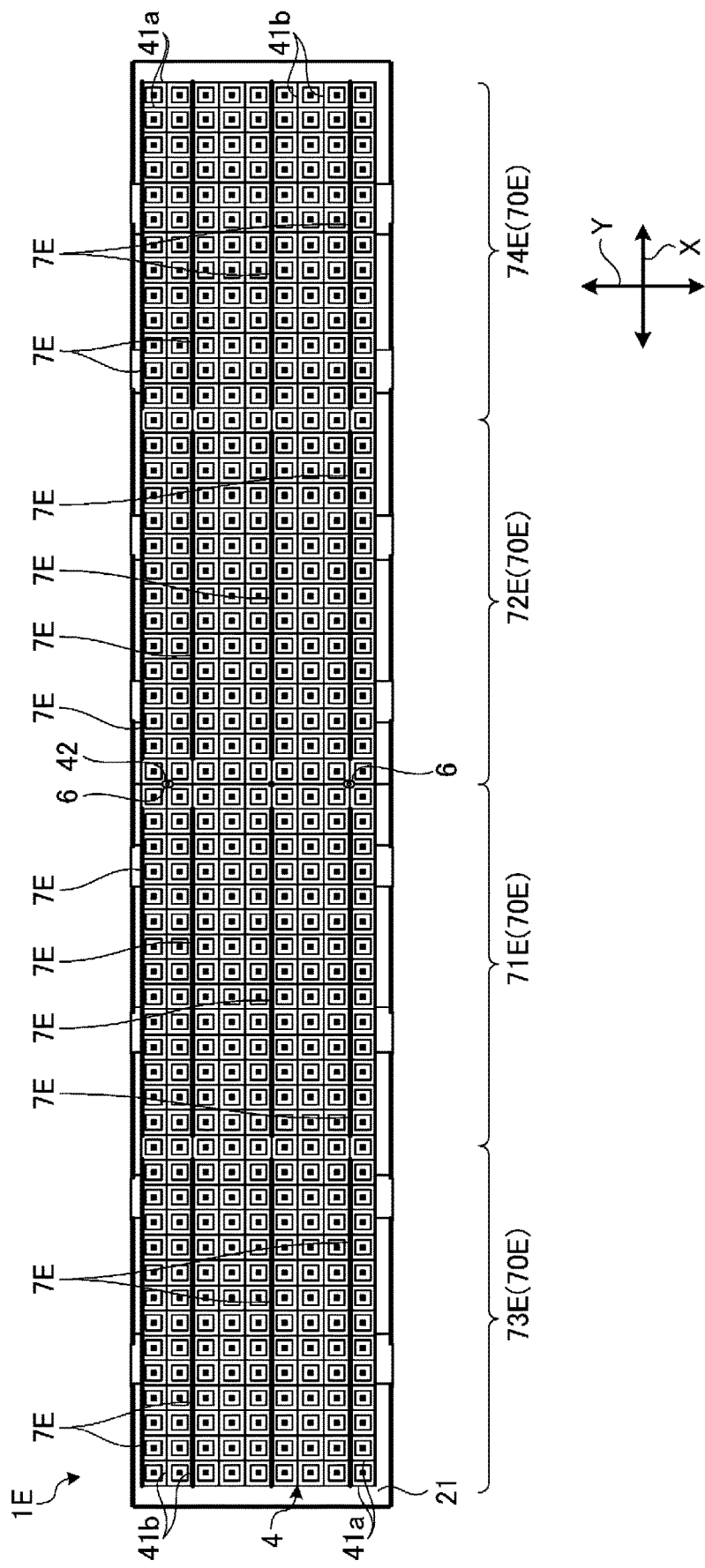
FIG. 15 is an explanatory view illustrating an example of an arrangement in another embodiment of a second fixing member.

FIG. 15 is a drawing illustrating an example of the arrangement of a second fixing member 7E in another embodiment of the planar illumination device 1 according to the first embodiment.

In the present embodiment, a force of the second fixing member 7E restricting the substrate 3 and the reflector 4 is a force based on an elasticity of the second fixing member 7E. Then, the second fixing member 7E has an elasticity at the center portion 42 in the longitudinal direction with respect to the substrate 3, being less than elasticities of portions of the substrate 3 separated in the longitudinal direction from the center portion 42. More specifically described, the elasticity of the second fixing members 7E disposed at first arrangement regions 71E, 72E centrally positioned in the longitudinal direction and the elasticity of the second fixing members 7E disposed at second arrangement regions 73E, 74E adjacent to the first arrangement regions 71E, 72E in the longitudinal direction are different.

The elasticity of the second fixing members 7E disposed at the first arrangement regions 71E, 72E in the longitudinal direction is less than the elasticity of the second fixing members 7E disposed at the second arrangement regions 73E, 74E in the longitudinal direction.

Examples of methods of varying the elasticity of the second fixing member 7E in accordance with the position in the longitudinal direction include varying a material of the double-sided tape serving as the second fixing member 7E in both. For example, the second fixing members 7E disposed at the first arrangement regions 71E, 72E include a base member of polyethylene terephthalate, for example. On the other hand, the second fixing members 7E disposed at the second arrangement regions 73E, 74E are formed without providing a base member of the polyethylene terephthalate, for example. By configuring the second fixing members 7E as described above, a force of the second fixing member 7E restricting the substrate 3 and the reflector 4 is increased at the center portion 42, while the force of the second fixing member 7E restricting the substrate 3 and the reflector 4 is decreased at portions separated in the longitudinal direction from the center portion 42.

Note that, as a method of varying the elasticity related to the second fixing member 7E in accordance with the position in the longitudinal direction, the second fixing members 7E disposed at the first arrangement regions 71E, 72E include a base member of polyethylene terephthalate, while the second fixing members 7E disposed at the second arrangement regions 73E, 74E include, for example, a foamed acrylic base member. That is, materials of the base members are made to differ from each other, and the elasticity (flexibility) of the second fixing members 7E positioned away from the center in the longitudinal direction is greater than the elasticity (flexibility) of the second fixing members 7E positioned at the center in the longitudinal direction. Further, as an adhesive layer of the second fixing member 7E, an acrylic material is used.

The first arrangement regions 71E, 72E include four second fixing members 7E extending in the longitudinal direction, for example. The four second fixing members 7E disposed at the first arrangement regions 71E, 72E have the same length in the longitudinal direction, and have the same length in the lateral direction. The second arrangement regions 73E, 74E include four second fixing members 7E extending in the longitudinal direction, for example. The four second fixing members 7E disposed at the second arrangement regions 73E, 74E have the same length in the longitudinal direction, and have the same length in the lateral direction. Further, the length in the longitudinal direction and the length in the lateral direction of each second fixing member 7E disposed at the first arrangement regions 71E, 72E, and the length in the longitudinal direction and the length in the lateral direction of each second fixing member 7E disposed at the second arrangement regions 73E, 74E are the same. Then, the second fixing members 7E are disposed symmetrically with respect to the center line bisecting the reflector 4 in the longitudinal direction, and a fixing center of the second fixing member 7E is the center portion 42 in the longitudinal direction and coincides with the fixing center of the first fixing member 6.

An adhesive strength per unit area of the second fixing member (double-sided tape) 7E of the planar illumination device 1E according to the present embodiment is the same in any portion. Moreover, a width in a lateral direction orthogonal to a length direction of the second fixing member (double-sided tape) 7E is the same in any portion. Then, an elasticity of the second fixing members of, among the four arrangement regions 71E, 72E, 73E, 74E, the first arrangement regions 71E, 72E is less than an elasticity of the second fixing members 7E in the second arrangement regions 73E, 74E. Then, a force of the second fixing member 7E restricting the substrate 3 and the reflector 4 is greater at the center portion 42 of the reflector 4 in the longitudinal direction than at portions separated in the longitudinal direction from the center portion 42 of the reflector 4.

Further, the substrate 3 of the planar illumination device 1E of the present embodiment is configured to be divided into the plurality of regions 33 in the longitudinal direction, and the second fixing members 7E are double-sided tape and in the same arrangement in the plurality of regions 33. Then, the elasticity of the second fixing members 7E used in the portions separated in the longitudinal direction from the center portion 42 is less than the elasticity of the second fixing members 7E used in the center portion 42. Therefore, even when a temperature change in the vehicle occurs, the second fixing members 7E firmly fix the reflector 4 to the substrate 3 at the center portion 42 in the longitudinal direction while fixing the reflector 4 to the substrate 3 to the extent of no separation between the reflector 4 and the substrate 3 (with the occurrence of expansion and contraction of the second fixing members 7E) at portions separated in the longitudinal direction from the center portion 42.

Note that, in the planar illumination device 1E described above, an example of the second fixing members 7E being partially provided to the reflector 4 is described. However, the planar illumination device 1E according to the present embodiment is not limited to the second fixing member 7E being partially provided, and the second fixing member 7E may be densely provided. More specifically described, a separate second fixing member 7E may be provided between two second fixing members 7E in the lateral direction. Moreover, a separate second fixing member 7E extending in the lateral direction may be provided.

Seventh Embodiment

Figure 16:
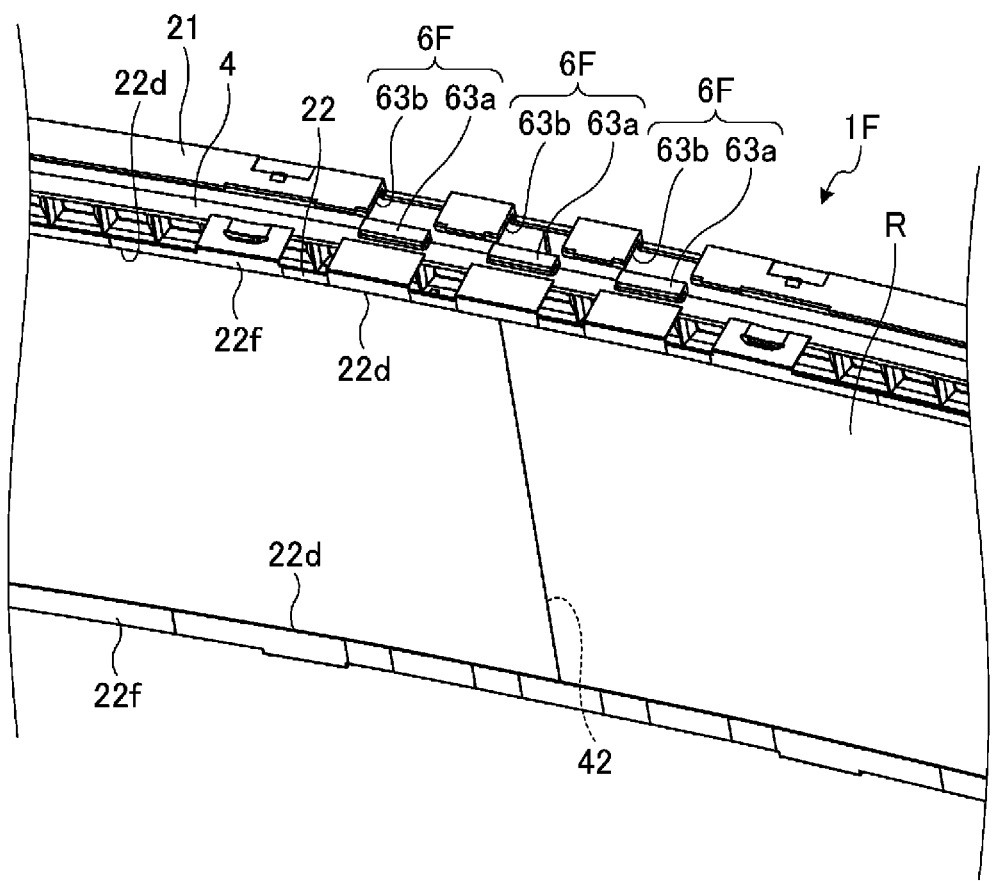
FIG. 16 is an exploded assembly view illustrating another example of a first fixing member, and is a perspective view illustrating one side of the reflector in a lateral direction orthogonal to a longitudinal direction.
Figure 17:
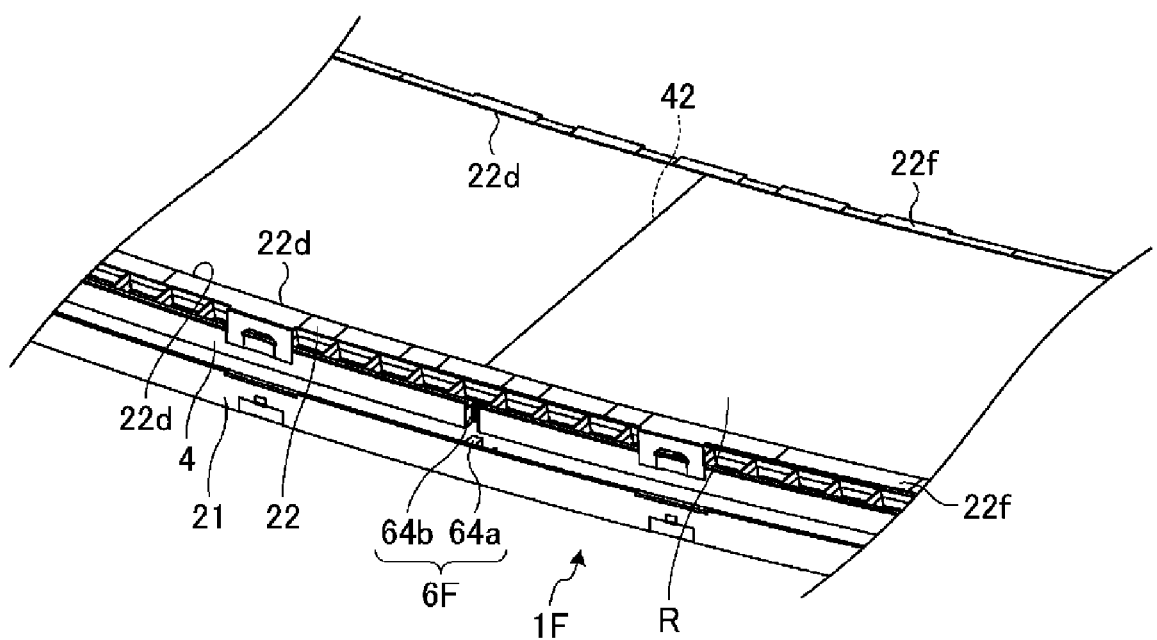
FIG. 17 is an exploded assembly view illustrating the other example of the first fixing member, and is a perspective view illustrating the other side of the reflector in the lateral direction.

FIG. 16 is an exploded assembly view illustrating another example of a first fixing member 6F in another embodiment of the planar illumination device 1 according to the first embodiment, and is a perspective view illustrating one side of the reflector 4 in the lateral direction orthogonal to the longitudinal direction. FIG. 17 is an exploded assembly view illustrating the other example of the first fixing member 6F in the other embodiment of a planar illumination device 1F according to the first embodiment, and is a perspective view illustrating the other side of the reflector 4 in the lateral direction.

The first fixing member 6F fixes the center portion 42 of the reflector 4 in the longitudinal direction to the bottom frame 21. That is, the planar illumination device 1F of the present embodiment includes the first fixing member 6F configured to fix the center portion 42 of the reflector 4 in the longitudinal direction to the bottom frame 21. In the planar illumination device 1F according to the present embodiment, the first fixing member 6F is provided at positions overlapping the frame edge part 22f when viewed from a direction orthogonal to a plane including the longitudinal direction of the reflector 4 and the lateral direction orthogonal to the longitudinal direction.

The first fixing member 6F, on one side in the lateral direction, is constituted by an engagement claw 63a formed at the reflector 4, and an engagement receiving part 63b formed at the bottom frame 21 and engageable with the engagement claw. Further, the first fixing member 6F, on the other side in the lateral direction, is constituted by an engagement claw 64a formed at the bottom frame 21, and an engagement receiving part 64b formed at the reflector 4 and engageable with the engagement claw. The first fixing member 6F according to the present embodiment restricts the movement of the reflector 4 in the lateral direction with respect to the bottom frame 21 and restricts the movement of the reflector 4 in the longitudinal direction with respect to the bottom frame 21 when a temperature change in the vehicle occurs. The first fixing members 6F of the present embodiment are disposed at the center portion 42 of the reflector 4 in the longitudinal direction.

The planar illumination device 1F according to the present embodiment is provided with the first fixing members 6F at the frame edge part 22f, making it possible to suppress complexities in a configuration of an inner side of the opening portion 22d. Note that the engagement claw 63a may be formed at the bottom frame 21, and the engagement receiving part 63b may be formed at the reflector 4.

Eighth Embodiment

Figure 18:
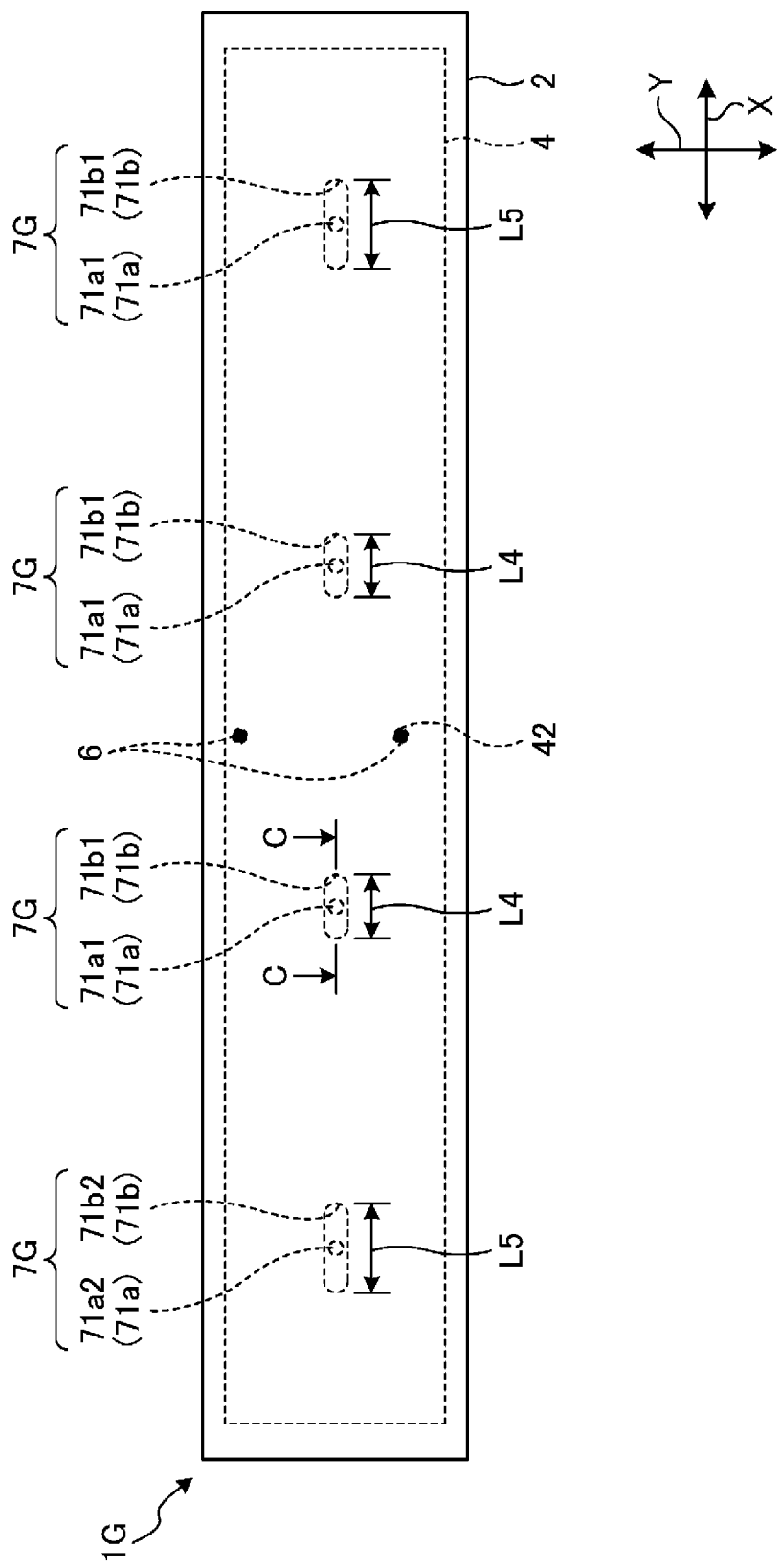
FIG. 18 is an explanatory view illustrating an example of yet another embodiment of a second fixing member.
Figure 19:
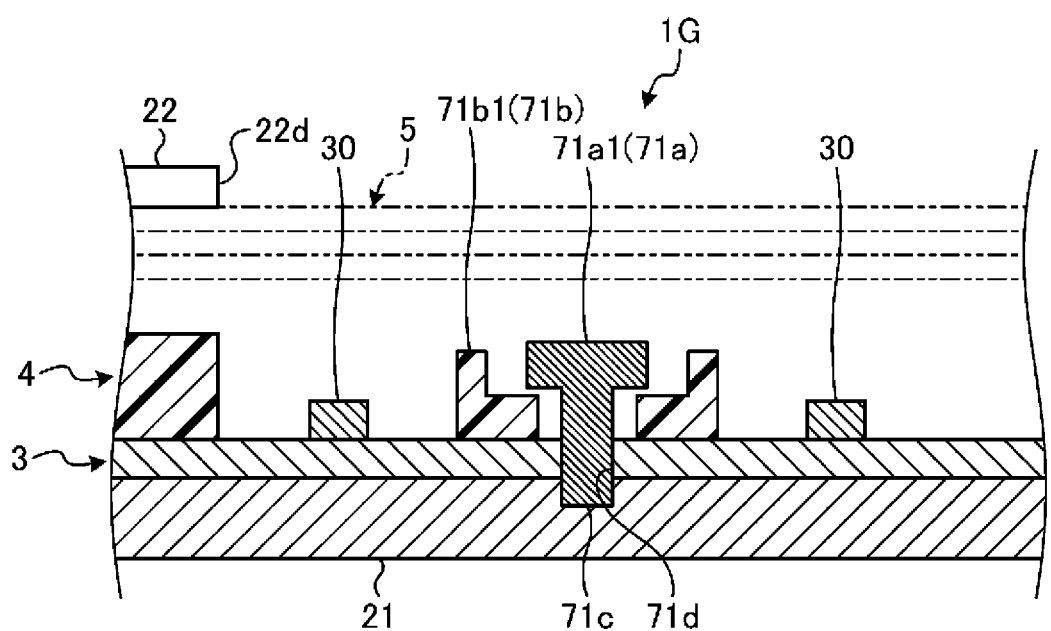
FIG. 19 is a cross-sectional view taken along a line C-C in FIG. 18.

FIG. 18 is a drawing illustrating an example of a second fixing member 7G in yet another embodiment of the planar illumination device 1 according to the first embodiment. FIG. 19 is a cross-sectional view taken along a line C-C in FIG. 18.

The second fixing member 7G according to the present embodiment is constituted by a pin 71a, a long hole 71b allowing insertion of the pin 71a and extending in the longitudinal direction, an engagement recessed part 71c configured to engage with the pin 71a, and a through-hole 71d provided at the substrate 3 and allowing insertion of the pin 71a. A planar illumination device 1G according to the present embodiment is provided with the engagement recessed part 71c at the bottom frame 21, and provided with the long hole 71b at the reflector 4. The through-hole 71d is a long hole having a longer length in the longitudinal direction than a length in the lateral direction.

The planar illumination device 1G according to the present embodiment includes four second fixing members 7G, for example. The planar illumination device 1G according to the present embodiment includes the second fixing members 7G provided at positions in the vicinity of the center portion 42 and the second fixing members 7G provided at positions separated from the center portion 42 in the longitudinal direction of the reflector 4, and configurations of both differ. Further, in the planar illumination device 1G according to the present embodiment, the four second fixing members 7G are disposed symmetrically with respect to the center portion 42 of the reflector 4 in the longitudinal direction. That is, the two second fixing members 7G provided at positions in the vicinity of the center portion 42 in the longitudinal direction are equal to each other in separation length from the center portion 42, and the two second fixing members 7G provided at positions separated from the center portion 42 are equal to each other in separation length from the center portion 42. Note that the separation length is a distance between the center portion 42 and a center of the pin 71a.

The second fixing members 7G provided at positions in the vicinity of the center portion 42 of the reflector 4 in the longitudinal direction allow movement of a first pin 71a1 in the longitudinal direction inside a first long hole 71b1 by a distance L4. On the other hand, the second fixing members 7G provided at positions separated from the center portion 42 of the reflector 4 in the longitudinal direction allow movement of a second pin 71a2 in the longitudinal direction inside a second long hole 71b2 by a distance L5 longer than the distance L4. That is, in the planar illumination device 1G according to the present embodiment, the distance L4 of allowing the first pin 71a1 to move inside the first long hole 71b1 in the second fixing members 7G provided at positions in the vicinity of the center portion 42 of the reflector 4 in the longitudinal direction is shorter than the distance L5 of allowing the pin 71a to move inside the long hole 71b in the second fixing members 7G provided at positions separated from the center portion 42 of the reflector 4 in the longitudinal direction. In other words, lengths of the long holes 71b1, 71b2 in the longitudinal direction increase as the position of the second fixing members 7G is increasingly separated from the center portion 42 in the longitudinal direction.

According to the configuration described above, when a temperature change from a low temperature to a high temperature occurs in the vehicle, reaching a predetermined temperature, first, the first pin 71a1 of the second fixing member 7G provided at a position in the vicinity of the center portion 42 of the reflector 4 in the longitudinal direction comes into contact with an end part of the first long hole 71b1 in the longitudinal direction. In the described state, the second pin 71a2 of the second fixing member 7G provided at a position separated from the center portion 42 of the reflector 4 in the longitudinal direction is in a state of non-contact with an end part of the second long hole 71b2 in the longitudinal direction. That is, in the described state, a force of the second engagement member, at a position in the vicinity of the center portion 42 in the longitudinal direction of the reflector 4, restricting the substrate 3 and the reflector 4 is greater than a force of the second engagement member, at a position separated from the center portion 42 in the longitudinal direction of the reflector 4, restricting the substrate 3 and the reflector 4.

According to the configuration described above, even when a temperature change in the vehicle occurs, the second fixing members 7G of the planar illumination device 1G according to the present embodiment firmly fix the reflector 4 to the substrate 3 at the center portion 42 in the longitudinal direction while fixing the reflector 4 to the substrate 3 to the extent of no separation between the reflector 4 and the substrate 3 at portions separated from the center portion 42 in the longitudinal direction.

Figure 20:
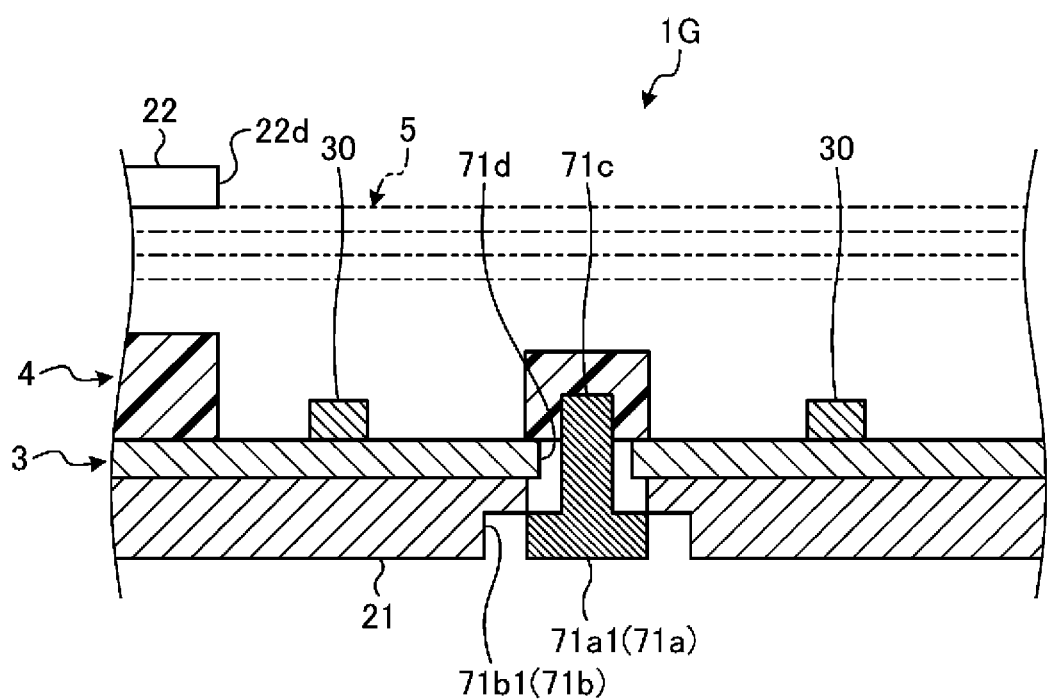
FIG. 20 is a cross-sectional view similar to FIG. 19 illustrating a modification example of the other embodiment.

FIG. 20 is a cross-sectional view similar to FIG. 19 illustrating a modification example of the planar illumination device 1G described above. The second fixing member 7G according to the present embodiment is provided with the engagement recessed part 71c at the reflector 4, and provided with the long hole 71b at the bottom frame 21. Furthermore, in the planar illumination device 1G according to the present embodiment, the through-hole 71d allowing passage of the pin 71a is provided at the substrate 3.

OTHER EMBODIMENTS

The planar illumination devices 1, 1A, 1B, 1C, 1D, 1E, 1F, 1G described in the embodiments described above are described as devices using an FPC having flexibility for the substrate 3 and having a curved exit surface R. However, the exit surface R of the planar illumination devices 1, 1A, 1B, 1C, 1D, 1E, 1F, 1G according to the present embodiment may be formed flat along a plane orthogonal to the thickness direction. In the planar illumination devices 1, 1A, 1B, 1C, 1D, 1E, 1F, 1G having a flat exit surface R, a rigid substrate can be used. Of course, even when the exit surface R is curved, a rigid substrate can be used.

Further, the first fixing member 6 according to the planar illumination devices 1, 1A, 1B, 1C, 1D, 1E, 1F, 1G of the embodiments described above is described as a member constituted by the pin 61 provided at the bottom frame 21 and the engagement hole 62 formed at the reflector 4. However, the first fixing member 6 according to the planar illumination devices 1, 1A, 1B, 1C, 1D, 1E, 1F, 1G of the present embodiments is not limited to the configuration, and an engagement recessed part configured to engage with the pin 61 and not pass through the reflector in the thickness direction may be formed at the reflector 4.

Furthermore, the first fixing member 6 according to the planar illumination devices 1, 1A, 1B, 1C, 1D, 1E, 1F, 1G of the embodiments described above is described as a member obtained by providing the pin 61 at the bottom frame 21 and forming the engagement hole 62 at the reflector 4. However, the first fixing member 6 according to the planar illumination devices 1, 1A, 1B, 1C, 1D, 1E, 1F, 1G of the present embodiments may be provided with, at a bottom surface of the reflector 4, a pin protruding toward the other surface side in the thickness direction, and provided with, at the bottom part 21a of the bottom frame 21, an engagement recessed part configured to engage with the pin.

Further, the first fixing member 6 according to the planar illumination devices 1, 1A, 1B, 1C, 1D, 1E, 1F, 1G of the embodiments described above is described as a member constituted by the pin 61 provided at the bottom frame 21 and the engagement hole 62 provided at the reflector 4. However, the first fixing member 6 according to the planar illumination device 1 according to the present embodiments is not limited to the configuration, and may be constituted by, for example, a bolt provided at the bottom frame 21 and a screw configured to engage with a bolt affixed to the reflector. Of course, the first fixing member 6 is not limited to the configurations, and may be an adhesive material provided between the bottom frame 21 and the reflector 4, or the reflector 4 may be welded to the bottom frame 21.

Furthermore, the second fixing members 7, 7A, 7B, 7C according to the planar illumination devices 1, 1A, 1B, 1C, 1D, 1E, 1F of the embodiments described above is described as being double-sided tape. However, the second fixing members 7, 7A, 7B, 7C according to the planar illumination device 1 of the present embodiments are not limited to being double-sided tape, and may be, for example, an adhesive.

Further, the first sheet opening 34a of the reflective sheet 34 in the planar illumination devices 1, 1A, 1B, 1C, 1D, 1E, 1F, 1G of the embodiments described above is described as an opening forming a rectangular shape. However, the first sheet opening 34a of the reflective sheet 34 in the planar illumination device 1 of the present embodiments is not limited to the rectangular shape, and can be changed to an appropriate shape such as circular, elliptical, or polygonal in accordance with the shape of the light source 30.

Furthermore, the shapes of the exit surface R (opening portion 22d) and the bottom part 21a of the bottom frame 21 need not be accurate rectangular shapes, and may, for example, have a portion missing in a part of an outer corner, as long as the longitudinal direction and the lateral direction are conceivable as a whole.

Further, the planar illumination devices 1, 1A, 1B, 1C, 1D, 1E, 1F, 1G of the embodiments described above are described as devices provided with the reflective sheet 34 separate from the substrate 3. However, the planar illumination devices 1, 1A, 1B, 1C, 1D, 1E, 1F, 1G of the present embodiments are not limited to the configuration, and need not necessarily be provided with the reflective sheet 34 at the substrate 3.

Furthermore, the substrate 3 according to the planar illumination devices 1, 1A, 1B, 1C, 1D, 1E, 1F, 1G of the embodiments described above is described as a substrate formed by being divided into the four regions 33. However, the substrate 3 according to the planar illumination devices 1, 1A, 1B, 1C, 1D, 1E, 1F, 1G of the present embodiment is not limited to the configuration, and may be formed integrally, or may be formed by being divided into two regions, three regions, or a plurality of six or more regions.

Further, the planar illumination devices 1, 1A, 1B, 1C, 1D, 1E, 1F, 1G of the embodiments described above are described as devices obtained by dividing the arrangement regions 70, 70A, 70B, 70C, 70D of the second fixing member 7 into four or five arrangement regions. However, the planar illumination devices 1, 1A, 1B, 1C, 1D, 1E, 1F, 1G of the present embodiments are not limited to the configuration, and may be formed with the arrangement regions 70, 70A, 70B, 70C, 70D divided into three arrangement regions, or a plurality of six or more arrangement regions.

Furthermore, the second fixing members 7, 7A, 7B, 7C of the planar illumination devices 1, 1A, 1B, 1C, 1D, 1E, 1F, 1G of the embodiments described above are described as members having a wider adhesion area of the center portion in the longitudinal direction with respect to the substrate 3 than the adhesion area of the portions separated in the longitudinal direction from the center portion of the substrate 3, and described as members having a greater adhesive strength per unit area at the center portion in the longitudinal direction with respect to the substrate 3 than the adhesive strengths per unit area at portions separated in the longitudinal direction from the center portion of the substrate 3. However, the planar illumination devices 1, 1A, 1B, 1C, 1D, 1E, 1F, 1G of the present embodiments are not limited to the configurations. For example, the second fixing members 7, 7A, 7B, 7C may change in adhesion area or may change in adhesive strength per unit area in accordance with the position in the longitudinal direction.

Further, the first fixing member 6 of the planar illumination devices 1, 1A, 1B, 1C, 1D, 1E, 1G of the present embodiments is described as a member disposed at the center portion in the longitudinal direction, inwardly of both end parts in the lateral direction. However, the first fixing member 6 of the planar illumination devices 1, 1A, 1B, 1C, 1D, 1E, 1G of the present embodiment is not limited to the configuration, and the first fixing member 6 may be disposed at the center portion in the longitudinal direction, at both end parts in the lateral direction (so-called frame edge parts 22f), for example.

Furthermore, the disclosure is not limited by the embodiments described above. A configuration obtained by appropriately combining the above-mentioned constituent elements is also included in the disclosure. Further effects and modification examples can be easily derived by a person skilled in the art. Thus, a wide range of aspects of the disclosure is not limited to the embodiments described above and may be modified variously.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A planar illumination device comprising:
   a substrate provided with a plurality of light sources at one surface side;
   a reflector provided at the one surface side of the substrate;
   a bottom frame provided at a surface side of the substrate opposite to the one surface side;
   a first fixing member configured to fix a center portion of the reflector in a longitudinal direction to the bottom frame; and
   a second fixing member configured to fix the one surface of the substrate and the reflector, wherein
   a force of the second fixing member restricting the substrate and the reflector is greater at a center portion of the reflector in the longitudinal direction than at a portion of the reflector separated in the longitudinal direction from the center portion.

2. The planar illumination device according to claim 1, wherein
   the force of the second fixing member restricting the substrate and the reflector is a force of the second fixing member fixing the substrate and the reflector.

3. The planar illumination device according to claim 2, wherein
   the second fixing member has an adhesion area of a center portion in the longitudinal direction with respect to the substrate being wider than an adhesion area of a portion separated in the longitudinal direction from the center portion of the substrate.

4. The planar illumination device according to claim 2, wherein
   the second fixing member has an adhesive strength per unit area at a center portion in the longitudinal direction with respect to the substrate being greater than an adhesive strength per unit area at a portion separated in the longitudinal direction from the center portion of the substrate.

5. The planar illumination device according to claim 1, wherein
   the substrate is configured to be divided into a plurality of regions in the longitudinal direction, and
   an arrangement of the second fixing member is changed in accordance with each position of the plurality of regions.

6. The planar illumination device according to claim 1, wherein
   the substrate includes a reflective sheet on the one surface side,
   the reflector includes a reflector opening exposing a head part of the light source to the one surface side,
   the reflective sheet includes a sheet opening exposing the head part of the light source to the one surface side, and
   a size of the sheet opening is smaller than a size of the reflector opening.

7. The planar illumination device according to claim 6, wherein
   the reflective sheet includes an opening at a disposed position of the second fixing member.

8. The planar illumination device according to claim 1, wherein
   the second fixing member is double-sided tape.

9. The planar illumination device according to claim 1, wherein
   the force of the second fixing member restricting the substrate and the reflector is a force based on an elasticity of the second fixing member, and
   the second fixing member has an elasticity at a center portion in the longitudinal direction with respect to the substrate, being less than an elasticity at a portion separated in the longitudinal direction from the center portion of the substrate.

10. The planar illumination device according to claim 1, wherein
    the second fixing member is constituted by a pin and a hole allowing insertion of the pin, and
    a length of the hole in the longitudinal direction increases as a position of the second fixing member is further separated from the center portion in the longitudinal direction.

11. The planar illumination device according to claim 1, comprising:
    a frame constituted by a top frame including a frame edge part with a frame opening formed at an inner side, and the bottom frame, wherein
    the first fixing member is provided at a position overlapping the frame edge part when viewed from a direction orthogonal to a plane including a longitudinal direction of the reflector and a lateral direction orthogonal to the longitudinal direction.

12. A planar illumination device comprising:
    a substrate provided with a plurality of light sources at one surface side;
    a reflector provided at the one surface side of the substrate; and
    a bottom frame provided at a surface side of the substrate opposite to the one surface side, wherein
    the substrate includes a reflective sheet on the one surface side, the reflective sheet being different from the reflector,
    the reflector includes a reflector opening exposing a head part of the light source to the one surface side,
    the reflective sheet includes a sheet opening exposing the head part of the light source to the one surface side, and
    the sheet opening is smaller than the reflector opening.

* * * * *